(12) United States Patent
Fischer et al.

(10) Patent No.: US 11,773,664 B1
(45) Date of Patent: Oct. 3, 2023

(54) VARIABLE FREQUENCY DRIVE CONFIGURATION FOR ELECTRIC DRIVEN HYDRAULIC FRACKING SYSTEM

(71) Applicant: National Service Alliance—Houston LLC, Houston, TX (US)

(72) Inventors: John Fischer, Hempstead, TX (US); John J. Crosetto, Oak Forest, IL (US); David Kubricht, Cypress, TX (US); Richard Cheatham, Houston, TX (US); Jeffrey Pollack, Joliet, IL (US); Chad Lawman, Joliet, IL (US); David Todd, Houston, TX (US); Tyler Nolen, Houston, TX (US)

(73) Assignee: National Service Alliance—Houston LLC, Houston, TX (US)

( * ) Notice: Subject to any disclaimer, the term of this patent is extended or adjusted under 35 U.S.C. 154(b) by 0 days.

(21) Appl. No.: 18/204,062

(22) Filed: May 31, 2023

Related U.S. Application Data

(63) Continuation of application No. 17/982,701, filed on Nov. 8, 2022, now Pat. No. 11,668,144, which is a
(Continued)

(51) Int. Cl.
*E21B 21/08* (2006.01)
*H02J 13/00* (2006.01)
(Continued)

(52) U.S. Cl.
CPC ............... *E21B 21/08* (2013.01); *E21B 4/04* (2013.01); *E21B 7/022* (2013.01); *E21B 43/2605* (2020.05); *E21B 43/2607* (2020.05); *F04B 17/03* (2013.01); *F04B 17/06* (2013.01); *F04D 13/0686* (2013.01); *H02B 1/52* (2013.01); *H02B 5/00* (2013.01); *H02J 13/00036* (2020.01);
(Continued)

(58) Field of Classification Search
CPC . E21B 21/08; E21B 4/04; E21B 7/022; F04B 17/03; F04D 13/0686
See application file for complete search history.

(56) References Cited

U.S. PATENT DOCUMENTS

| | | |
|---|---|---|
| 4,031,702 A | 6/1977 | Burnett et al. |
| 5,795,135 A | 8/1998 | Nyilas et al. |

(Continued)

*Primary Examiner* — Muhammad S Islam
(74) *Attorney, Agent, or Firm* — Taft Stettinius & Hollister LLP

(57) ABSTRACT

An electric driven hydraulic fracking system is disclosed. A pump configuration that includes the single VFD, the single shaft electric motor, and the single hydraulic pump that is mounted on the single pump trailer. A pump configuration includes a single VFD configuration, the single shaft electric motor, and the single shaft hydraulic pump mounted on the single pump trailer. The single VFD configuration converts the electric power at the power generation voltage level distributed from the power distribution trailer to a VFD voltage level and drives the single shaft electric motor to control the operation of the single shaft electric motor and the single hydraulic pump. The VFD voltage level is a voltage level that is required to drive the single shaft electric motor. The VFD configuration also controls operation of the auxiliary systems based on the electric power at the auxiliary voltage level.

20 Claims, 6 Drawing Sheets

Related U.S. Application Data continuation of application No. 17/735,759, filed on May 3, 2022, now Pat. No. 11,492,860, which is a continuation of application No. 17/480,809, filed on Sep. 21, 2021, now Pat. No. 11,319,762, which is a continuation of application No. 17/226,953, filed on Apr. 9, 2021, now Pat. No. 11,125,034, which is a continuation of application No. 17/134,860, filed on Dec. 28, 2020, now Pat. No. 10,975,641, which is a continuation of application No. 16/943,719, filed on Jul. 30, 2020, now Pat. No. 10,876,358, which is a continuation of application No. 16/790,581, filed on Feb. 13, 2020, now Pat. No. 10,753,153.

(60) Provisional application No. 62/805,521, filed on Feb. 14, 2019.

(51) Int. Cl.

| | | |
|---|---|---|
| *E21B 43/26* | (2006.01) | |
| *E21B 4/04* | (2006.01) | |
| *E21B 7/02* | (2006.01) | |
| *F04B 17/03* | (2006.01) | |
| *F04B 17/06* | (2006.01) | |
| *F04D 13/06* | (2006.01) | |
| *H02B 1/52* | (2006.01) | |
| *H02B 5/00* | (2006.01) | |
| *H02K 7/18* | (2006.01) | |
| *H02P 27/04* | (2016.01) | |
| *E21B 4/02* | (2006.01) | |

(52) U.S. Cl.
CPC ............... *H02K 7/18* (2013.01); *H02P 27/04* (2013.01); *E21B 4/02* (2013.01); *F05B 2220/706* (2013.01); *F05B 2240/941* (2013.01)

(56) References Cited

U.S. PATENT DOCUMENTS

| | | | |
|---|---|---|---|
| 5,865,247 A | 2/1999 | Paterson et al. | |
| 6,109,372 A | 8/2000 | Dorel et al. | |
| 6,129,529 A | 10/2000 | Young et al. | |
| 6,271,637 B1 | 8/2001 | Kushion | |
| 7,053,568 B2 | 5/2006 | Rudinec | |
| 7,092,771 B2 | 8/2006 | Retlich et al. | |
| 7,539,549 B1 | 5/2009 | Discenzo et al. | |
| 7,949,483 B2 | 5/2011 | Discenzo et al. | |
| 8,056,635 B2 | 11/2011 | Shampine et al. | |
| 8,106,527 B1 | 1/2012 | Carr | |
| 8,789,601 B2 | 7/2014 | Broussard et al. | |
| 8,997,904 B2 | 4/2015 | Cryer et al. | |
| 9,366,114 B2 | 6/2016 | Coli et al. | |
| 9,410,410 B2 | 8/2016 | Broussard et al. | |
| 9,475,020 B2 | 10/2016 | Coli et al. | |
| 9,534,473 B2 | 1/2017 | Morris et al. | |
| 9,556,721 B2 | 1/2017 | Jang et al. | |
| 9,611,728 B2 | 4/2017 | Oehring | |
| 9,650,871 B2 | 5/2017 | Oehring et al. | |
| 9,650,879 B2 | 5/2017 | Broussard et al. | |
| 9,777,723 B2 | 10/2017 | Wiegman et al. | |
| 9,970,278 B2 | 5/2018 | Broussard et al. | |
| 10,227,854 B2 | 3/2019 | Glass et al. | |
| 10,519,730 B2 | 12/2019 | Morris et al. | |
| 10,550,665 B1 * | 2/2020 | Golden | F16K 31/041 |
| 10,648,311 B2 | 5/2020 | Oehring et al. | |
| 10,753,153 B1 | 8/2020 | Fischer et al. | |
| 10,975,641 B1 | 4/2021 | Fischer et al. | |
| 11,492,860 B2 | 11/2022 | Fischer et al. | |
| 2006/0260331 A1 | 11/2006 | Andreychuk | |
| 2008/0083222 A1 | 4/2008 | Hubert | |
| 2012/0224977 A1 | 9/2012 | Sotz et al. | |
| 2013/0030438 A1 | 1/2013 | Fox | |
| 2013/0306322 A1 | 11/2013 | Sanborn et al. | |
| 2014/0010671 A1 | 1/2014 | Cryer et al. | |
| 2014/0012416 A1 | 1/2014 | Negishi et al. | |
| 2014/0062088 A1 | 3/2014 | Carr | |
| 2015/0252661 A1 | 9/2015 | Glass | |
| 2016/0025826 A1 | 1/2016 | Taicher | |
| 2016/0326854 A1 | 11/2016 | Broussard et al. | |
| 2016/0326855 A1 | 11/2016 | Coli et al. | |
| 2016/0369609 A1 | 12/2016 | Morris et al. | |
| 2017/0222409 A1 * | 8/2017 | Oehring | H02B 7/06 |
| 2018/0101502 A1 | 4/2018 | Nassif et al. | |
| 2018/0112468 A1 * | 4/2018 | Savage | E21B 21/08 |
| 2018/0156210 A1 | 6/2018 | Oehring et al. | |
| 2018/0189702 A1 | 7/2018 | Hunter et al. | |
| 2018/0258746 A1 | 9/2018 | Broussard et al. | |
| 2019/0293063 A1 | 9/2019 | Scott | |
| 2020/0135289 A1 | 4/2020 | Ng et al. | |
| 2020/0300073 A1 | 9/2020 | Hinderliter et al. | |
| 2020/0347725 A1 | 11/2020 | Morris et al. | |
| 2021/0010465 A1 | 1/2021 | Hancock, Jr. et al. | |
| 2022/0003060 A1 | 4/2022 | Fischer et al. | |

* cited by examiner

VARIABLE FREQUENCY DRIVE CONFIGURATION FOR ELECTRIC DRIVEN HYDRAULIC FRACKING SYSTEM

CROSS-REFERENCE TO RELATED APPLICATIONS

This application is a continuation of U.S. Nonprovisional Application Ser. No. 17/982,701 filed on Nov. 11, 2022 which claims the benefit of U.S. Nonprovisional application Ser. No. 17/735,759 filed on May 3, 2022 which issued as U.S. Pat. No. 11,492,860 on Nov. 8, 2022 which claims the benefit of Ser. No. 17/480,809 filed on Sep. 21, 2021 which issued as U.S. Pat. No. 11,319,762 on May 3, 2022 which claims the benefit of U.S. Nonprovisional application Ser. No. 17/226,953 filed on Apr. 9, 2021 which issued as U.S. Pat. No. 11,125,034 on Sep. 21, 2021 which claims the benefit of U.S. Nonprovisional application Ser. No. 17/134,860 filed on Dec. 28, 2020 which issued as U.S. Pat. No. 10,975,641 on Apr. 22, 2021, which claims the benefit of U.S. Nonprovisional application Ser. No. 16/943,719, filed on Jul. 30, 2020 which issued as U.S. Pat. No. 10,876,358 on Dec. 29, 2020, which claims the benefit of U.S. Nonprovisional application Ser. No. 16/790,581, filed on Feb. 13, 2020 which issued as U.S. Pat. No. 10,753,153 on Aug. 25, 2020, which claims the benefit of U.S. Provisional Application No. 62/805,521 filed on Feb. 14, 2019, which is incorporated herein by reference in its entirety.

FIELD OF DISCLOSURE

The present disclosure generally relates to electric driven hydraulic fracking systems and specifically to a single Variable Frequency Drive (VFD), a single shaft electric motor, and a single hydraulic pump positioned on a single pump trailer.

RELATED ART

Conventional hydraulic fracking systems are diesel powered in that several different diesel engines apply the power to the hydraulic pumps as well as several types of auxiliary systems that assist the hydraulic pumps to execute the fracking, such as hydraulic coolers and lube pumps. Conventional diesel powered hydraulic fracking systems require a diesel engine and a transmission to be connected to a hydraulic pump to drive the hydraulic pump. However, typically several hydraulic pumps are required at a single fracking site to prepare the well for the later extraction of the fluid, such as hydrocarbons, from the existing well. Thus, each of the several hydraulic pumps positioned at a single fracking site require a single diesel engine and single transmission to adequately drive the corresponding hydraulic pump requiring several diesel engines and transmissions to also be positioned at the single fracking site in addition to the several hydraulic pumps.

Typically, the diesel engines limit the horsepower (HP) that the hydraulic pumps may operate thereby requiring an increased quantity of hydraulic pumps to attain the required HP necessary prepare the well for the later extraction of fluid, such as hydrocarbons, from the existing well. Any increase in the power rating of hydraulic pumps also results in an increase in the power rating of diesel engines and transmissions required at the fracking site as each hydraulic pump requires a sufficiently rated diesel engine and transmission. As the diesel engines, transmissions, and hydraulic pumps for a single fracking site increase, so does quantity of trailers required to transport and position configurations at the fracking site.

The numerous diesel engines, transmissions, and hydraulic pumps required at a fracking site significantly drives up the cost of the fracking operation. Each of the numerous trailers required to transport and position configurations require CDL drivers to operate as well as increased manpower to rig the increased assets positioned at the fracking site and may be classified as loads in need of permits, thus adding expense and possible delays. The amount of diesel fuel required to power the numerous diesel engines to drive the numerous hydraulic pumps required to prepare the well for the later extraction of the fluid, such as hydrocarbons, from the existing well also significantly drives up the cost of the fracking operation. Further, the parasitic losses typically occur as the diesel engines drive the hydraulic pumps as well as drive the auxiliary systems. Such parasitic losses actually decrease the amount of HP that is available for the hydraulic pumps operate thereby significantly decreasing the productivity of hydraulic pumps. In doing so, the duration of the fracking operation is extended resulting in significant increases in the cost of the fracking operation. The diesel engines also significantly increase the noise levels of the fracking operation and may have difficulty operating within required air quality limits.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

Figure 5:
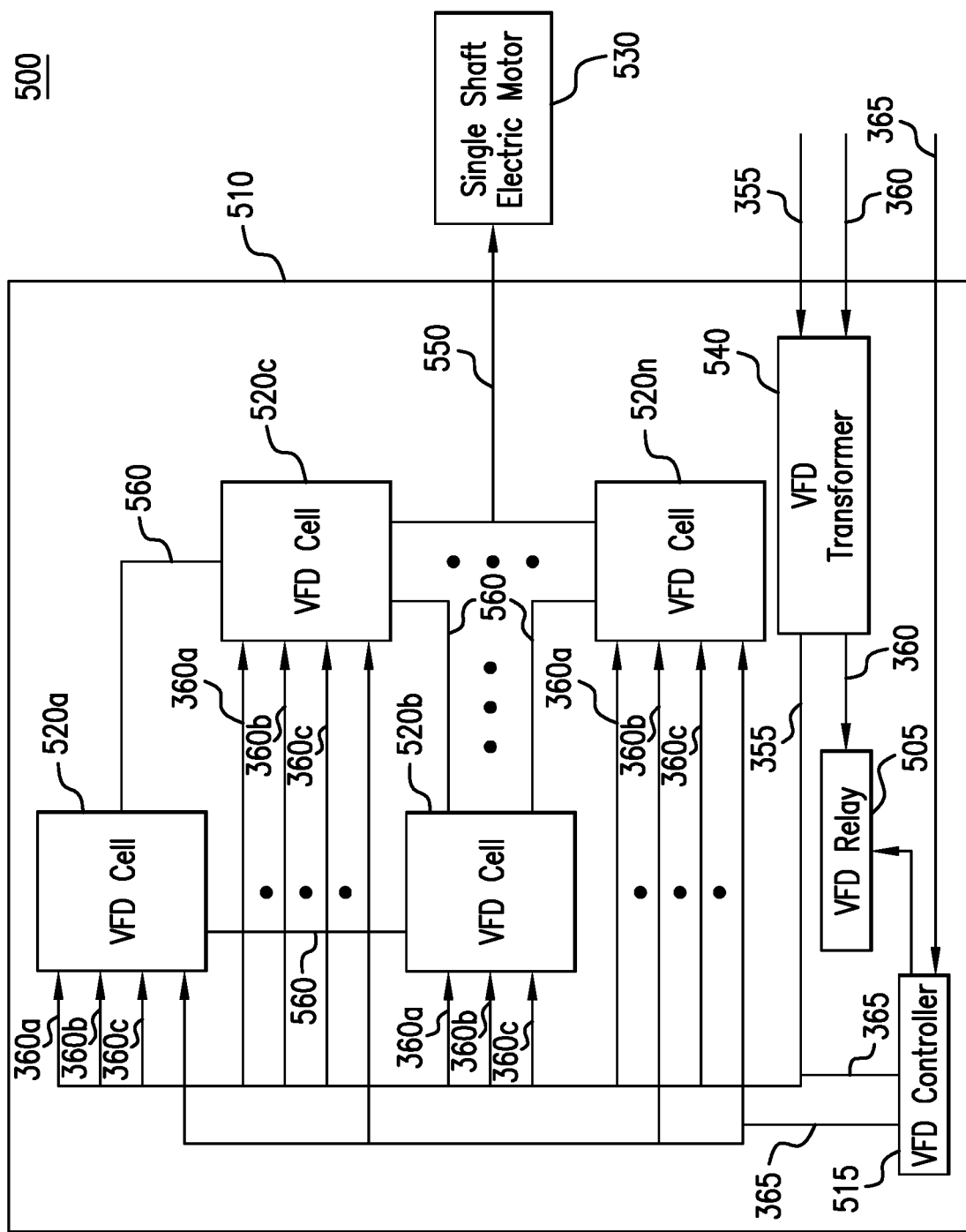
Figure 6:
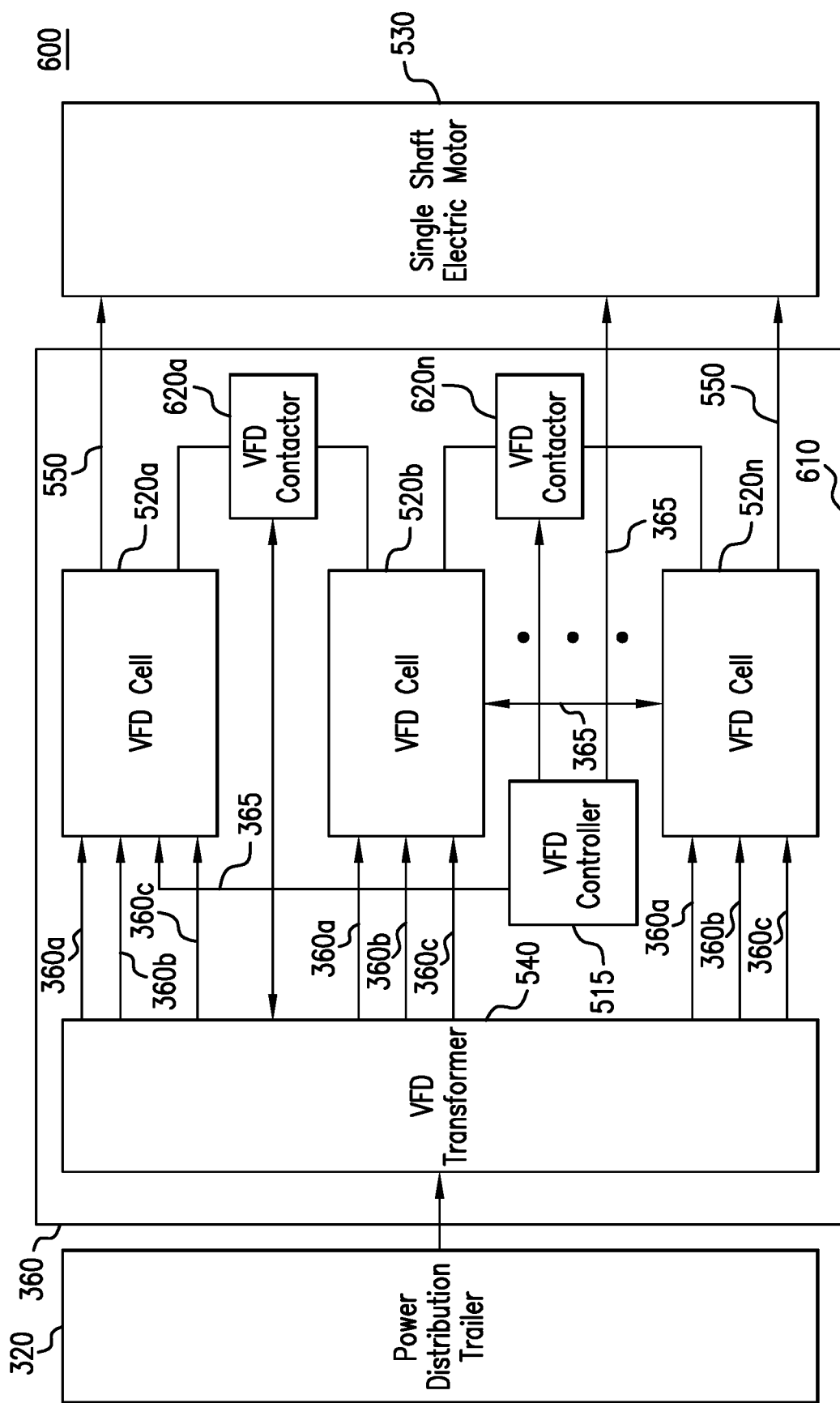

FIG. 5 illustrates a block diagram of an electric driven hydraulic fracking system that provides an electric driven system to execute a fracking operation in that a VFD configuration includes a plurality of VFD cells that are isolated in order to generate the electric power at the VFD voltage level to drive the single shaft motor; and FIG. 6 illustrates a block diagram of an electric driven hydraulic fracking system that provides an electric driven system to execute a fracking operation in that a VFD configuration includes a plurality of VFD cells that are electrically connected to a corresponding VFD contactor from a plurality of VFD contactors in order to bypass a VFD cell that is no longer operating at its full capacity such that the fracking operation continues.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

System Overview

Figure 1:
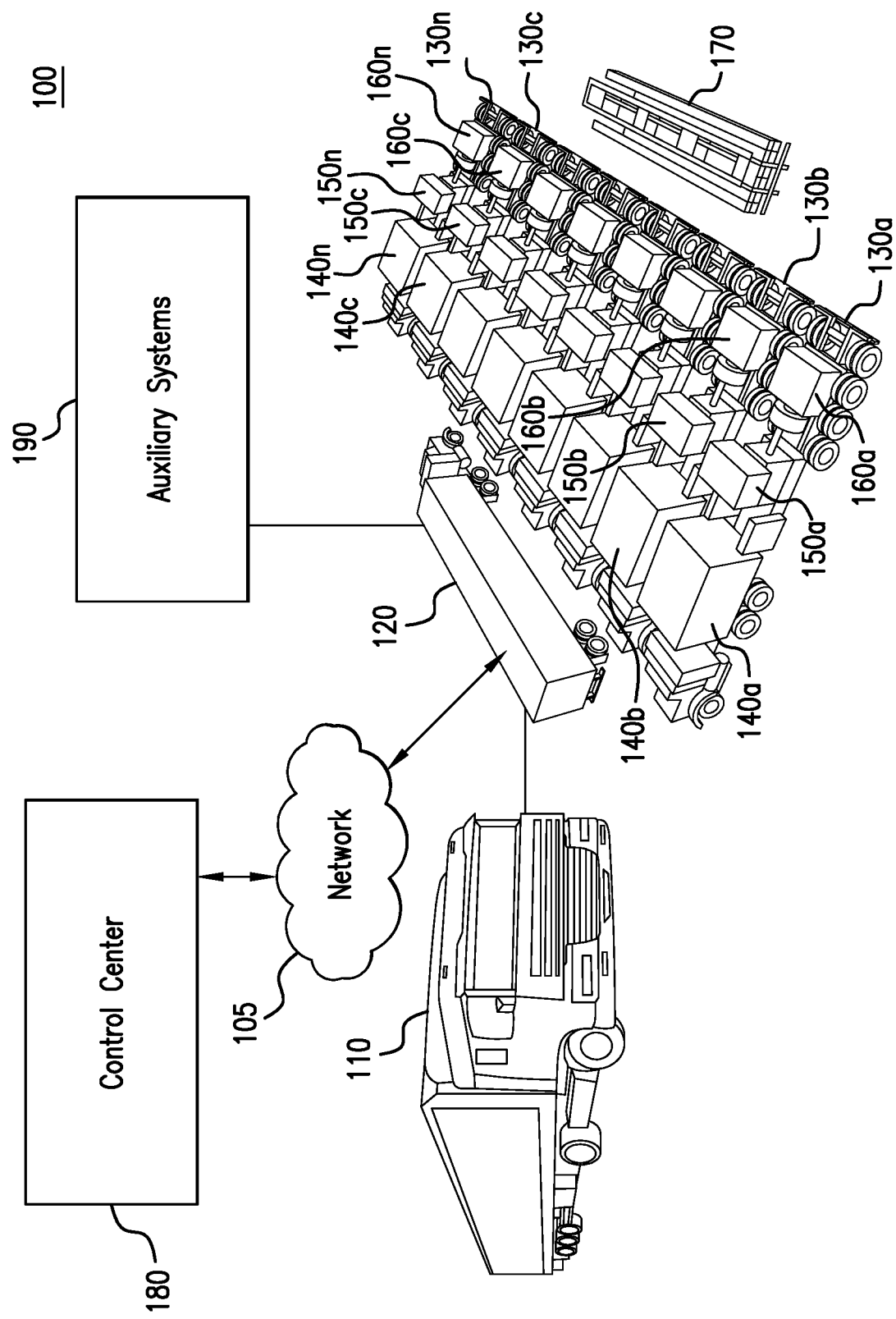
FIG. 1 illustrates a top-elevational view of a hydraulic fracking operation such that the hydraulic pumps may pump a fracking mixture into a fracking well to execute a fracking operation to extract a fluid from the fracking well.

FIG. 1 illustrates a top-elevational view of a hydraulic fracking operation such that the hydraulic pumps may pump a fracking media into a well to execute a fracking operation to extract a fluid from the well. A hydraulic fracking operation 100 includes a fracking trailer 170 that a fracking configuration may be deployed. The fracking configuration may be the fracking equipment that executes the actual fracking to prepare the well for the later extraction of the fluid from the well. For example, the fracking trailer 170 may include the fracking equipment that implements the missile as well as the well heads that are affixed onto the well and distribute the fracking media into the well to prepare the well for later extraction of the fluid from the well. The fluid extracted from the well may include a liquid, such as crude oil, and so on, or a gas, such as such as hydrocarbons, natural gas and so on, that is extracted from the well that is then stored and distributed.

The power that is generated to provide power to each of the numerous components included in the hydraulic fracking operation 100 is positioned on a power generation system 110. Often times, the fracking site is a remote site where it has been determined that sufficient fluid has been located underground to justify temporarily establishing the hydraulic fracking operation 100 for a period of time to drill the well and extract the fluid from the well. Such fracking sites are often times positioned in remote locations such as uninhabited areas in mountainous regions with limited road access to the fracking sites such that the hydraulic fracking operation 100 is often times a mobile operation where each of the components are positioned on trailers that are then hauled to the fracking site via semi-trucks and/or tractors. For example, the fracking trailer 170 includes the fracking equipment which is hauled in via a semi-truck and is positioned closest to the well as compared to the other components in order to execute the fracking operation.

In another example, the power generation system 110 may also be a mobile operation such that the power generation equipment may be mounted on a power generation trailer and transported to the fracking site via a semi-truck and/or tractor. The power generation system 110 may be positioned on the fracking site such that any component of the hydraulic fracking operation 100 may be powered by the power generation system 110. In doing so, the power required for the hydraulic fracking operation 100 may be consolidated to the power generation system 110 such that the power generation system 110 provides the necessary power required for the hydraulic fracking operation 100. Thus, the power generation system 110 may be positioned at the fracking site in a manner such that each component of the hydraulic fracking operation 100 may have power distributed from the power generation system 110 to each respective component of the hydraulic fracking operation 100.

The power generation system 110 may include power generation systems that generate electric power such that the hydraulic fracking operation 100 is powered via electric power generated by the power generation system 110 and does not require subsidiary power generation systems such as subsidiary power generation systems that include diesel engines. In doing so, the power generation system 110 may provide electric power to each component of the hydraulic fracking operation 100 such that the hydraulic fracking operation 100 is solely powered by electric power generated by the power generation system 110. The power generation system 110 may consolidate the electric power that is generated for the electric driven hydraulic fracking system 100 such that the quantity and size of power sources included in the power generation system 110 is decreased.

The power sources are included in the power generation system 110 and output electric power such that the electric power outputted from each power source included in the power generation system 110 is collectively accumulated to be electric power at a power generation voltage level as will be discussed in detail below. For example, the power output for each of the power sources included in the power generation system 110 may be paralleled to generate the electric power at the power generation voltage level. The power generation system 110 may include numerous power sources as well as different power sources and any combination thereof. For example, the power generation system may include power sources that include a quantity of gas turbine engines. In another example, the power generation system 110 may include a power source that includes an electric power plant that independently generates electric power for an electric utility grid. In another example, the power generation system 110 may include a combination of gas turbine engines and an electric power plant. The power generation system 110 may generate the electric power at a power level and a voltage level.

The power generation system 110 may generate electric power at a power generation voltage level in which the power generation voltage level is the voltage level that the power generation system is capable of generating the electric power. For example, the power generation system 110 when the power sources of the power generation system 110 include a quantity of gas turbine engines may generate the electric power at the power generation voltage level of 13.8 kV which is a typical voltage level for electric power generated by gas turbine engines. In another example, the power generation system 110 when the power sources of the power generation system include an electric power plan may generate the electric power at the power generation voltage level of 12.47 kV which is a typical voltage level for electric power generated by an electric power plant.

In another example, the power generation system 110 may generate electric power that is already at a VFD voltage level to power the single shaft electric motor 150(*a-n*) as discussed in detail below. In such an example, the power generation system 110 may generate the electric power that is already at the VFD voltage level of 4160V. In another example, the power generation system 110 may generate the electric power at the power generation voltage level at a range of 4160V to 15 kV. In another example, the power generation system 110 may generate electric power at the power generation voltage level of up to 38 kV. The power generation system 110 may generate the electric power at any power generation voltage level that is provided by the power sources included in the power generation system 110 that will be apparent to those skilled in the relevant art(s) without departing from the spirit and scope of the disclosure. The power generation system 110 may then provide the electric power at the power generation voltage level to the power distribution trailer 120 via a medium voltage cable.

In an embodiment, the power generation system 110 may generate electric power at a power level of at least 24 Mega Watts (MW) that is generated at a power generation voltage level of at least 13.8 kV. In another embodiment, the power generation system 110 may generate electric power at a power level of at least 24 MW that is generated at a power generation voltage level of at least 12.47 kV. The power generation system 110 may generate electric power at a power level such that there is sufficient electric power to adequately power each of the components of the hydraulic fracking operation 100 while having gas turbine engines in quantity and in size that enable the gas turbine engines to be transported to the fracking site and set up remotely via a trailer. In doing so, the power distribution trailer 110 may include gas turbine engines that generate sufficient electric power to adequately power each of the components of the hydraulic fracking operation 100 while not requiring a large quantity of gas turbine engines and gas turbine engines of significant size that may significantly increase the difficulty and the cost to transport the gas turbine engines to the fracking site.

In order to provide sufficient electric power to adequately power each of the components of the hydraulic fracking operation 100 while not requiring large quantities of gas turbine engines and/or gas turbine engines of significant size, the power distribution trailer 110 may include single or multiple gas turbine engines that generate electric power at power levels of 5 MW, 12 MW, 16 MW, 20-25 MW, 30 MW and/or any other wattage level that may not require large quantities of gas turbine engines and/or gas turbine engines of significant size that will be apparent to those skilled in the relevant art(s) without departing from the spirit and scope of the disclosure. In another example, the power generation system 110 may be the electric utility power plant that is local to the location of the fracking operation such that the power distribution trailer 120 may receive the electric power at the power level of 24 MW and the power generation voltage level of 12.47 kV directly from the electric utility power plant.

In an embodiment, the power generation system 110 may include a first gas turbine engine that generates electric power at a first power level in range of 12 MW to 16 MW and a second gas turbine engine that generates electric power at a second power level in a range of 12 MW to 16 MW. The first gas turbine engine and the second gas turbine engine generate the same voltage level of at least 13.8 kV that is provided to a power distribution trailer 120 when the first power level is in the range of 12 MW to 16 MW generated by the first gas turbine engine is combined with the second power level in the range of 12 MW to 16 MW. In order to provide sufficient electric power to adequately power each component of the hydraulic fracking operation 100 as well as limit the quantity of gas turbine engines as well as the size of the gas turbine engines such that the gas turbine engines may be positioned on a single trailer and transported to the fracking site, the power generation system 110 may include two electric gas turbine engines that generate electric power at power levels in the range of 12 MW to 16 MW such that the electric powers at the power levels in the range of 12 MW to 16 MW may be paralleled together to generate the total electric power that is available to power each of the components of the hydraulic fracking operation 100 is in the range of 24 MW to 32 MW.

Further, the power generation system 110 including more than one gas turbine engine to generate the electric power provides redundancy in the power generation for the hydraulic fracking operation 100. In doing so, the power generation system 110 provides a redundancy to the electric driven hydraulic fracking system in that the first gas turbine engine continues to provide the first power level to the power distribution trailer 120 when the second gas turbine engine suffers a short circuit and/or other shutdown condition and the second gas turbine engine continues to provide the second power level to the power distribution trailer 120 when the first gas turbine engine suffers the short circuit and/or other shutdown condition. The power generation system 110 may then maintain a reduced quantity of hydraulic pump(s) 160(*a-n*) to continuously operate in the continuous duty cycle without interruption in continuously pumping the fracking media due to the redundancy provided by the first gas turbine engine and the second gas turbine engine.

By incorporating two gas turbine engines that generate electric power at power levels in the range of 12 MW to 16 MW redundancy may be provided in that the electric power that is provided to the components of the hydraulic fracking operation 100 such that the fracking media is continuously pumped into the well to execute the fracking operation to prepare the well for the later extraction of the fluid from the well despite one of the gas turbine engines suffering a short circuit condition. In doing so, the incident energy at the point where the short circuit occurs may be reduced due to the reduced short circuit availability of the power generation system 110. However, if one of the gas turbine engines were to fail due to a short circuit condition, the remaining gas turbine engine may continue to provide sufficient power to ensure the fracking media is continuously pumped into the well. A failure to continuously pump the fracking media into the well may result in the sand, which is a major component of the fracking media coming out of the suspension and creating a plug at the bottom of the well which typically results in a significant expense to remove the sand in the well so that the fracking can continue. The power generation system 110 may include any combination of gas turbine engines and/or single gas turbine engine at any power level to sufficiently generate electric power to adequately power each of the components of the hydraulic fracking operation 100 that will be apparent to those skilled in the relevant art(s) without departing from the spirit and scope of the disclosure.

The power generation system 110 may generate the electric power at a power generation voltage level that is in the medium voltage range of 1.0 kilo Volts (kV) to 72.0 kV. However, in an embodiment, the power generation system 110 may generate the electric power at the power generation voltage level of 13.8 kV. In another embodiment, the power generation system 110 may generate the electric power at the power generation voltage level of 13.8 kV. The generation of the electric power at the voltage level in the medium voltage range enables medium voltage cables to be used to connect the power generation system 110 to the power distribution trailer 120 to propagate the electric power from the power generation system 110 to the power distribution trailer 120 as well as enabling the use of medium voltage cables to propagate the electric voltage level to any of the components powered by the electric power in the medium voltage range. The use of medium voltage cables rather than the use of low voltage cables decreases the size of the cable required in that medium voltage cables require less copper than low voltage cables thereby reducing the size and/or quantity of the cables required for the distribution of power throughout the hydraulic fracking operation 100.

Further, the consolidation of gas turbine engines to decrease the quantity of gas turbine engines required to power the components of the hydraulic fracking operation 100 and/or the incorporation of the electric utility power plant also consolidates the quantity of medium voltage cables that are required to connect each of the gas turbine engines to the power distribution trailer 120 thereby further reducing the cost of the cables required for the hydraulic fracking operation 100. Further, the power generation system 110 generated the electric power at the power generation voltage level of 13.8 kV and/or 12.47 kV enables the hydraulic fracking operation 100 to be more easily integrated with any electric utility grid anywhere in the world such that the electric utility grid may be more easily substituted into the power generation system 110 in replacement of the gas turbine engines since it is more common that the electric utility grid has transformers available to deliver the electric power at the power generation voltage level of 13.8 kV and/or 12.47 kV.

The power distribution trailer 120 may distribute the electric power at the power level generated by the power generation system 110 to each variable frequency drive (VFD) 140(*a-n*) positioned on each pump trailer 130(*a-n*). As noted above, the power generation system 110 may include at least one gas turbine engine, the electric utility grid, and/or a combination thereof, to generate the electric power. In doing so, a medium voltage power cable may be connected from each component of the power generation system 110 to the power distribution trailer 120. For example, the power generation system 110 may include two gas turbine engines with each of the gas turbine engines generating electric power at the power level of 12 MW to 16 MW at the voltage level of 13.8 kV. In such an example, two medium voltage cables may then connect each of the two gas turbine engines to the power distribution trailer 120 such that the electric power at the power level of 12 MW to 16 MW at the voltage level of 13.8 kV may propagate from the gas turbine engines to the power distribution trailer 120.

The power distribution trailer 120 may then distribute the electric power to each of the VFDs 140(*a-n*) positioned on each of the pump trailers 130(*a-n*). As will be discussed in detail below, several different hydraulic pumps 160(*a-n*) may be required to continuously pump the fracking media into the well to execute the fracking operation to prepare the well for the later extraction of the fluid from the well. In doing so, each of the different hydraulic pumps 160(*a-n*) may be driven by a corresponding VFD 140(*a-n*) also positioned on the corresponding pump trailer 130(*a-n*) with the hydraulic pump 160(*a-n*). Each of the VFDs 140(*a-n*) may then provide the appropriate power to drive each of the single shaft electric motors 150(*a-n*) that then drive each of the hydraulic pumps 160(*a-n*) to continuously pump the fracking media into the well to execute the fracking operation to prepare the well for the later extraction of the fluid from the well. Thus, the power distribution trailer 120 may distribute the electric power generated by the power distribution trailer 110 which is consolidated to reduce the quantity of the gas turbine engines to the several different VFDs 140(*a-n*) positioned on each of the pump trailers 130(*a-n*). The components of the power distribution trailer 120 may be transported to the fracking site.

For example, the power distribution trailer 120 is configured to distribute the electric power at the power level of at least 24 MW generated by the at least one gas turbine engine from the voltage level of at least 13.8 kV to the single VFD 140*a* positioned on the single pump trailer 130*a*. In such an example, the power generation system 110 includes two different gas turbine engines that generate the electric power at the power level of 12 MW to 16 MW and at the voltage level of 13.8 kV. Two different medium voltage cables may then propagate the electric power generated by each of the two gas turbine engines at the power level of 12 MW to 16 MW and at the voltage level of 13.8 kV to the power distribution trailer 120. The power distribution trailer 120 may then combine the power levels of 12 MW to 16 MW generated by each of the two gas turbine engines to generate a power level of 24 MW to 32 MW at the voltage level of 13.8 kV. The power distribution trailer 120 may then distribute the electric power at the voltage level of 13.8 kV to each of eight different VFDs 140(*a-n*) via eight different medium voltage cables that propagate the electric power at the voltage level of 13.8 kV from the power distribution trailer 120 to each of the eight different VFDs 140(*a-n*). The power distribution trailer 120 may distribute the power generated by any quantity of gas turbine engines to any quantity of VFDs that will be apparent to those skilled in the relevant art(s) without departing from the spirit and scope of the disclosure.

In an embodiment, the power distribution trailer 120 may include a plurality of switch gear modules in that each switch gear module switches the electric power generated by each of the components of the power generation system 110 and received by the corresponding medium voltage cable to the medium voltage cable on and off to each of the corresponding VFDs 140(*a-n*). For example, the power distribution trailer 120 may include eight different switch gear modules to independently switch the electric power generated by the two gas turbine engines at the medium voltage level of 13.8 kV as received by the two different medium voltage cables on and off to the eight different medium voltage cables for each of the eight corresponding VFDs 140(*a-n*) to distribute the electric power at the medium voltage level of 13.8 kV to each of the eight corresponding VFDs 140(*a-n*).

In such an embodiment, the switch gear modules may include a solid state insulated switch gear (2SIS) that is manufactured by ABB and/or Schneider Electric. Such medium voltage switch gears may be sealed and/or shielded such that there is no exposure to live medium voltage components. Often times the fracking site generates an immense amount of dust and debris so removing any environmental exposure to live medium voltage components as provided by the 2SIS gear may decrease the maintenance required for the 2SIS. Further, the 2SIS may be permanently set to distribute the electric power from each of the gas turbine engines to each of the different VFDs 140(*a-n*) with little maintenance. The power distribution trailer 120 may incorporate any type of switch gear and/or switch gear configuration to adequately distribute the electric power from the power generation system 110 to each of the different VFDs 140(*a-n*) that will be apparent to those skilled in the relevant art(s) without departing from the spirit and scope of the disclosure.

Figure 2:
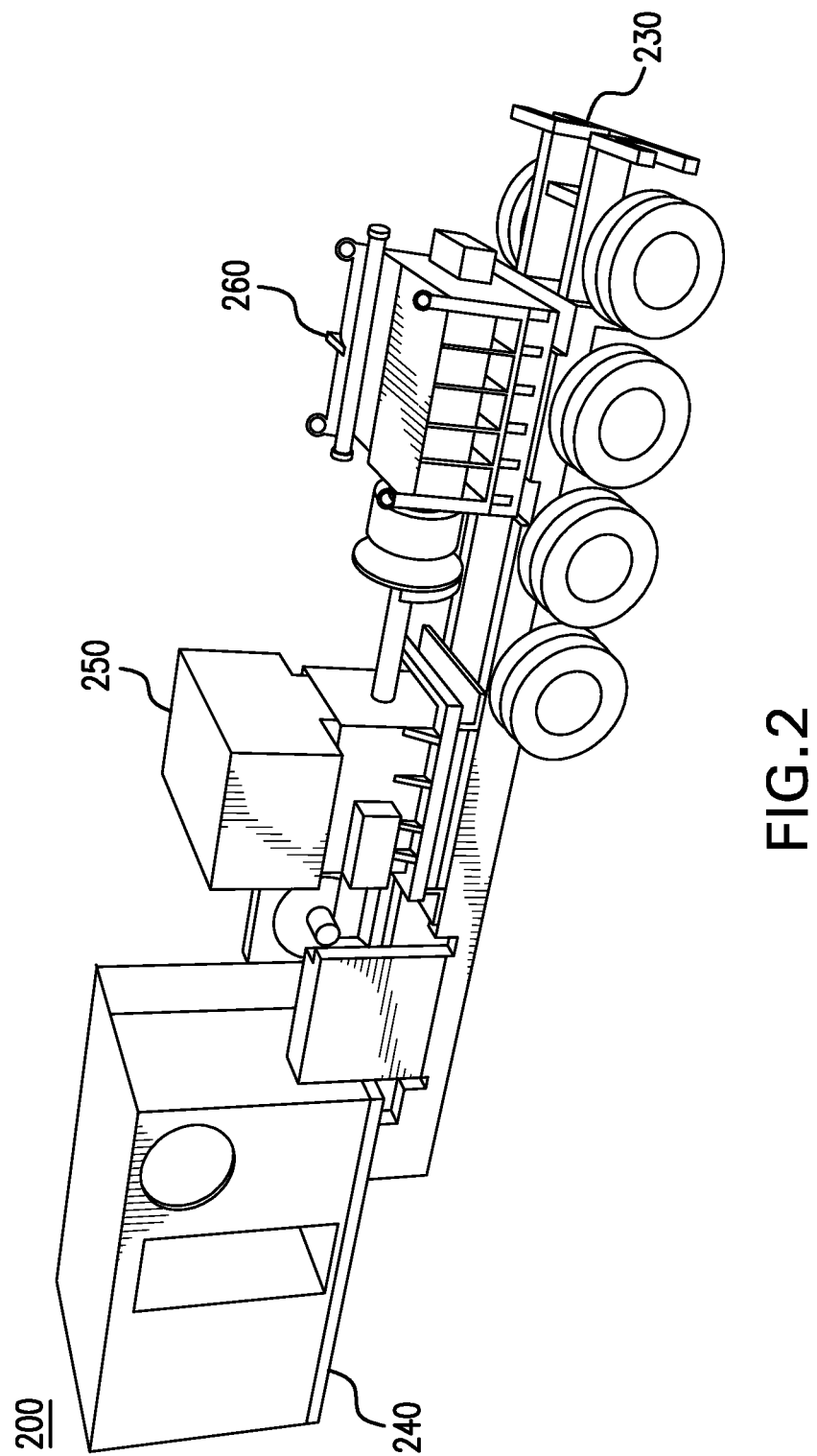
FIG. 2 illustrates a top-elevational view of a single pump configuration that includes a single VFD, a single shaft electric motor, and a single hydraulic pump that are each mounted on a single pump trailer.

As noted above, the power distribution trailer 120 may distribute the electric power at the power generation voltage level generated by the power generation system 110 to each of the different VFDs 140(*a-n*) positioned on the corresponding pump trailer 130(*a-n*). FIG. 2 illustrates a top-elevational view of a single pump configuration 200 that includes a single VFD 240, a single shaft electric motor 250 and a single hydraulic pump 260 that are each mounted on a single pump trailer 230. The single pump configuration 200 shares many similar features with each pump trailer 130(*a-n*) that includes each corresponding VFD 140(*a-n*), single shaft electric motor 150(*a-n*), and single hydraulic pump 160(*a-n*) depicted in the hydraulic fracking operation 100; therefore, only the differences between the single pump configuration 200 and the hydraulic fracking operation 100 are to be discussed in further details.

The power distribution trailer 120 may distribute the electric power at the voltage level generated by the power generation system 110 to the single VFD 240 that is positioned on the single pump trailer 130(*a-n*). The single VFD 240 may then drive the single shaft electric motor 250 and the single hydraulic pump 260 as well as control the operation of the single shaft electric motor 250 and the single hydraulic pump 260 as the single shaft electric motor 250 continuously drives the single hydraulic pump 260 as the single hydraulic pump 260 continuously pumps the fracking media into the well to execute the fracking operation to prepare the well for the later extraction of the fluid from the well. In doing so, the VFD 240 may convert the electric power distributed by the power distribution trailer 120 at the power generation voltage level generated by the power generation system 110 to a VFD voltage level that is a voltage level that is adequate to drive the single shaft electric motor 250. Often times, the power generation voltage level of the electric power distributed by the power distribution trailer 120 as generated by the power generation system 110 may be at a voltage level that is significantly higher than a voltage level that is adequate to drive the single shaft electric motor 250. Thus, the single VFD 240 may convert the power generation voltage level of the electric power as distributed by the power distribution trailer 120 to significantly lower (or higher) the voltage level to the VFD voltage level that is needed to drive the single shaft electric motor 250. In an embodiment, the single VFD 240 may convert the power generation voltage level of the electric power as distributed by the power distribution trailer 120 to the VFD voltage level of at least 4160V. In another embodiment, the single VFD 240 may convert the power generation voltage level of the electric power as distributed by the power distribution trailer 120 to the VFD voltage level that ranges from 4160V to 6600V. In another embodiment, the single VFD 240 may convert the power generation level of the electric power as distributed by the power distribution trailer 120 to the VFD voltage level that ranges from 0V to 4160V.

For example, the power generation system 110 generates the electric power at a power generation voltage level of 13.8 kV. The power distribution trailer 120 then distributes the electric power at the power generation voltage level of 13.8 kV to the single VFD 240. However, the single shaft electric motor 250 operates at a rated voltage level of at least 4160V in order to drive the single hydraulic pump 260 in which the rated voltage level of at least 4160V for the single shaft electric motor 250 to operate is significantly less than the power generation voltage level of 13.8 kV of the electric power that is distributed by the power distribution trailer 120 to the single VFD 240. The single VFD 240 may then convert the electric power at the power generation voltage level of at least 13.8 kV distributed from the power distribution trailer 120 to a VFD rated voltage level of at least 4160V and drive the single shaft electric motor 250 that is positioned on the single pump trailer 230 at the VFD rated voltage level of at least 4160V to control the operation of the single shaft electric motor 250 and the single hydraulic pump 260. The single VFD 240 may convert any voltage level of the electric power distributed by the power distribution trailer 120 to any VFD voltage level that is adequate to drive the single shaft electric motor that will be apparent to those skilled in the relevant art(s) without departing from the spirit and scope of the disclosure.

The single VFD 240 may also control the operation of the single shaft electric motor 250 and the single hydraulic pump 260. The single VFD 240 may include a sophisticated control system that may control in real-time the operation of the single shaft electric motor 250 and the single hydraulic pump 260 in order for the single shaft electric motor 250 and the single hydraulic pump 260 to adequately operate to continuously pump the fracking media into the well to execute the fracking operation to prepare the well for the later extraction of the fluid from the well. Although, the single shaft electric motor 250 and the single hydraulic pump 260 may operate continuously to continuously pump the fracking media into the well, such continuous operation may not be continuously executed with the same parameters throughout the continuous operation. The parameters in which the single shaft electric motor 250 and the single hydraulic pump 260 may continuously operate may actually vary based on the current state of the fracking operation. The single VFD 240 may automatically adjust the parameters in which the single shaft electric motor 250 and the single hydraulic pump continuously operate to adequately respond to the current state of the fracking operation.

As noted above, the single VFD 240 may convert the electric power at the power generation voltage level distributed by the power distribution trailer 120 to the VFD voltage level that is adequate to drive the single shaft electric motor 250. The single shaft electric motor 250 may be a single shaft electric motor in that the single shaft of the electric motor is coupled to the single hydraulic pump 260 such that the single shaft electric motor 250 drives a single hydraulic pump in the single hydraulic pump 260. The single shaft electric motor 250 may continuously drive the single hydraulic pump 260 at an operating frequency to enable the single hydraulic pump 260 to continuously pump the fracking media into the well to execute the fracking operation to prepare the well for the later extraction of the fluid from the well. The single shaft electric motor 250 may operate at the VFD voltage levels and at the operating frequencies below or above the rated levels in order to rotate at a RPM level that is appropriate to continuously drive the single hydraulic pump 260 at the maximum horsepower (HP) level that the single hydraulic pump 260 is rated to pump. In an embodiment, the single shaft electric motor 250 may operate at a VFD voltage level of at least 4160V. In an embodiment, the single shaft electric motor 250 may operate at a VFD voltage level in a range of 4160V to 6600V. In an embodiment, the single shaft electric motor 250 may operate at a VFD voltage level in arrange of 0V to 4160V. The single shaft electric motor 250 may operate any VFD voltage level that is adequate to continuously drive the single hydraulic pump 260 that will be apparent to those skilled in the relevant art(s) without departing from the spirit and scope of the disclosure.

For example, the power distribution trailer 120 may distribute the electric power to the single VFD 240 at the power generation voltage level of 13.8 kV. The single VFD 240 may then convert the electric power at the power generation voltage level of 13.8 kV to the VFD voltage level of 4160V to adequately drive the single shaft electric motor 250. The single shaft electric motor 250 may operate at an operating frequency of 60 Hz and when the VFD voltage level of 4160V to adequately drive the single shaft electric motor at the operating frequency of 60 Hz, the single shaft electric motor 250 may then rotate at a RPM level of at least 750 RPM. The single shaft electric motor 250 may rotate at a RPM level of at least 750 RPM based on the VFD voltage level of at least 4160V as provided by the single VFD 240 and to drive the single hydraulic pump 260 that is positioned on the single pump trailer 230 with the single VFD 240 and the single shaft electric motor 250 with the rotation at the RPM level of at least 750 RPM.

In an embodiment, the single shaft electric motor 250 may rotate at a RPM level of at least 750 RPM. In an embodiment, the single shaft electric motor 250 may rotate at a RPM level of 750 RPM to 1400 RPM. The single shaft electric motor 250 may operate at any RPM level to continuously drive the single hydraulic pump 260 that will be apparent to those skilled in the relevant art(s) without departing from the spirit and scope of the disclosure. The single shaft electric motor may operate at any operating frequency to continuously drive the single hydraulic pump 260 that will be apparent to those skilled in the relevant art(s) without departing from the spirit and scope of the disclosure.

The single shaft electric motor 250 may be an induction motor that rotates at the RPM level needed to obtain required pump speed based on the input gear box ratio of the single hydraulic pump 260. Based on the operating frequency of the single shaft motor 250 and the VFD voltage level applied to the single shaft electric motor 250, the single shaft electric motor 250 may then rotate at the required RPM level and produce sufficient torque to cause the pump to produce the required flow rate of fracking media at the required output pressure level. However, the VFD voltage level applied to the single shaft electric motor 250 may be determined based on the input gear box ratio of the single hydraulic pump 260 as the single shaft electric motor 250 cannot be allowed to rotate at the RPM level that exceeds the maximum speed rating of the input gear box of the single hydraulic pump 260 or the maximum speed of the single hydraulic pump 260. The single shaft electric motor 250 may be an induction motor, a traction motor, a permanent magnet motor and/or any other electric motor that continuously drives the single hydraulic pup 260 that will be apparent to those skilled in the relevant art(s) without departing from the spirit and scope of the disclosure.

As noted above, the single shaft electric motor 250 may be coupled to a single hydraulic pump in the single hydraulic pump 260 and drive the single hydraulic pump 260 such that the single hydraulic pump 260 continuously pumps the fracking media into the well to execute the fracking operation to prepare the well for the later extraction of the fluid from the existing well. The single hydraulic pump 260 may operate on a continuous duty cycle such that the single hydraulic pump 260 continuously pumps the fracking media into the well. Rather than operating on an intermittent duty cycle that causes conventional hydraulic pumps to temporarily stall in the pumping of the fracking media into the well, the single hydraulic pump 260 in operating on a continuous duty cycle may continuously pump the fracking media into the well without any intermittent stalling in the pumping. In doing so, the efficiency in the fracking operation to prepare the well for the later extraction of the fluid from the well may significantly increase as any intermittent stalling in pumping the fracking media into the well may result in setbacks in the fracking operation and may increase the risk of sand plugging the existing well. Thus, the single hydraulic pump 260 in operating on the continuous duty cycle may prevent any setbacks in the fracking operation due to the continuous pumping of the fracking media into the well.

The single hydraulic pump 260 may continuously pump the fracking media into the well at the HP level that the single hydraulic pump 260 is rated. The increase in the HP level that the single hydraulic pump 260 may continuously pump the fracking media into the well may result in the increase in the efficiency in the fracking operation to prepare the well for later extraction of the fluid from the well. For example, the single hydraulic pump 260 may continuously pump the fracking media into the well at the HP level of at least 5000 HP as driven by the single shaft motor 250 at the RPM level of at least 750 RPM. The single hydraulic pump 260 operates on a continuous duty cycle to continuously pump the fracking media at the HP level of at least 5000 HP. In an embodiment, the single hydraulic pump 260 may operate at continuous duty with a HP level of 5000 HP and may be a Weir QEM5000 Pump. However, the single hydraulic pump 260 may any type of hydraulic pump that operates on a continuous duty cycle and at any HP level that adequately continuously pumps the pumping fracking media into the well to execute the fracking operation to prepare the well for the later extraction of the fluid from the well that will be apparent to those skilled in the relevant art(s) without departing from the spirit and scope of the disclosure.

The single pump trailer 230 discussed in detail above may then be incorporated into the hydraulic fracking operation 100 depicted in FIG. 1. Each of the several pumps trailers 130(a-n), where n is an integer equal to or greater than one, may be in incorporated into the hydraulic fracking operation 100 to increase the overall HP level that is applied to the fracking equipment positioned on the fracking trailer 170 by each of the single hydraulic pumps 160(a-n) positioned on each of the pump trailers 130(a-n). In doing so, the overall HP level that is applied to the fracking equipment positioned on the fracking trailer 170 to continuously pump the fracking media into the well may be significantly increased as the HP level that is applied to the fracking equipment is scaled with each single hydraulic pump 160(a-n) that is added to the hydraulic fracking operation 100.

The positioning of each single VFD 140(a-n), single shaft electric motor 150(a-n), and each single hydraulic pump 160(a-n) positioned on each corresponding pump trailer 130(a-n) enables the power distribution trailer 120 to distribute the electric power at the power generation voltage level to each single VFD 140(a-n) from a single power distribution source rather than having a corresponding single power distribution source for each single VFD 140(a-n), single shaft electric motor 150(a-n), and each single hydraulic pump 160(a-n). In doing so, the electric power at the power generation voltage level may be distributed to each single VFD 140(a-n), where n is in an integer equal to or greater than one and corresponds to the number of pump trailers 130(a-n), then each single VFD 140(a-n) may individually convert the power generation voltage level to the appropriate VFD voltage for the single shaft electric motor 150(a-n) and the single hydraulic pump 160(a-n) that is positioned on the corresponding pump trailer 130(a-n) with the single VFD 140(a-n). The single VFD 140(a-n) may then also control the corresponding single shaft electric motor 150(a-n) and the single hydraulic pump 160(a-n) that is positioned on the corresponding pump trailer 130(a-n) with the single VFD 140(a-n).

In isolating the single VFD 140(a-n) to convert the electric power at the power generation voltage level to the appropriate VFD voltage level for the single shaft electric motor 150(a-n) and the single hydraulic pump 160(a-n) positioned on the corresponding single pump trailer 130(a-n) as the single VFD 140(a-n), the capabilities of the single pump trailer 130(a-n) may then be easily scaled by replicating the single pump trailer 130(a-n) into several different pump trailers 130(a-n). In scaling the single pump trailer 130(a-n) into several different pump trailers 130(a-n), the parameters for the single VFD 140(a-n), the single shaft electric motor 150(a-n), and the single hydraulic pump 160(a-n) may be replicated to generate the several different pump trailers 130(a-n) and in doing so scaling the hydraulic fracking operation 100.

In doing so, each single VFD 140(a-n) may convert the electric power at the power generation voltage level as distributed by the power distribution trailer 120 to the VFD voltage level to drive each single shaft electric motor 150(a-n), where n is an integer equal to or greater than one and corresponds to the quantity of single VFDs 140(a-n) and pump trailers 130(a-n), such that each single shaft electric motor 150(a-n) rotates at the RPM level sufficient to continuously drive the single hydraulic pump 160(a-n) at the HP level of the single hydraulic pump 160(a-n). Rather than simply having a single hydraulic pump 260 as depicted in FIG. 2 and discussed in detail above to continuously pump at the HP level of the single hydraulic pump 260, several different hydraulic pumps 160(a-n), where n is an integer equal to or greater than one and corresponds to the to the quantity of single VFDs 140(a-n), single shaft electric motors 150(a-n) and pump trailers 130(a-n), as positioned on different pump trailers 160 may be scaled together to scale the overall HP level that is provided to the fracking equipment as positioned on the fracking trailer 170. In doing so, the overall HP level that is provided to the fracking equipment to continuously pump the fracking media into the well to execute the fracking operation to prepare the well for the later extraction of the fluid from the well may be easily scaled by incorporating each of the individual pump trailers 130(a-n) each with single hydraulic pumps 160(a-n) operating at the HP levels to scale the HP levels of the single hydraulic pumps 160(a-n) to generate the overall HP level for the hydraulic fracking operation 100.

For example, each of the single hydraulic pumps 160(a-n) positioned on each corresponding pump trailer 130(a-n) may be operating on a continuous duty cycle at a HP level of at least 5000 HP. A total of eight pump trailers 130(a-n) each with a single hydraulic pump 160(a-n) positioned on the corresponding pump trailer 130(a-n) results in a total of eight hydraulic pumps 160(a-n) operating on a continuous duty cycle at a HP level of at least 5000 HP. In doing so, each of the eight hydraulic pumps 160(a-n) continuously pump the fracking media into the well at a HP level of at least 40,000 HP and do so continuously with each of the eight hydraulic pumps 160(a-n) operating on a continuous duty cycle. Thus, the fracking media may be continuously pumped into the well at a HP level of at least 40,000 HP to execute the fracking operation to prepare the well for the later extraction of the fluid from the well. The hydraulic pumps 160(a-n) positioned on each corresponding pump trailer 130(a-n) may operate on a continuous duty at any HP level and the and the quantity of pump trailers may be scaled to any quantity obtain an overall HP level for the hydraulic fracking operation 100 that will be apparent to those skilled in the relevant art(s) without departing from the spirit and scope of the disclosure.

Further, conventional hydraulic fracking operations that incorporate diesel engines require a diesel engine to drive each conventional hydraulic pump rather than being able to consolidate the power generation to a power generation system 110 that consolidates the quantity and size of the gas turbine engines to generate the electric power. Such an increase in diesel engines significantly increases the cost of the fracking operation in that significantly more trailers and/or significantly over size/weight trailers are required to transport the diesel engines resulting in significantly more and/or specialized semi-trucks and/or trailers required to transport the diesel engines which requires significantly more CDL drivers. As the overall asset count increases at the fracking site, the overall cost increases due to the increased amount of manpower required, the costs and delays related to permitted loads, as well as an increase in the amount of rigging that is required to rig each of the diesel engines to the conventional hydraulic pumps and so on. Rather, the electric driven hydraulic fracking operation 100 decreases the asset count by consolidating the power generation to the gas turbine engines of decreased size and quantity that are consolidated into the power generation system 110. The power distribution trailer 120 then further decreases the cost by consolidating the medium voltage cabling that is required to power each of the assets thereby decreasing the amount of rigging required.

Further, conventional hydraulic fracking operations that incorporate diesel engines suffer significant parasitic losses throughout the different components included in the fracking operation. Diesel engines that generate at a power level equal to the rated power level of the conventional fracking pumps may not result in delivering the full rated power to the pump due to parasitic losses throughout the conventional diesel fracking trailer configuration. For example, the diesel engines may suffer parasitic losses when driving the hydraulic coolers and the lube pumps that are associated with the conventional hydraulic pump in addition to the parasitic losses suffered from driving the conventional hydraulic pump itself. In such an example, the diesel engine may be driving the conventional hydraulic pump that is rated at 2500 HP at the HP level of 2500 HP but due to parasitic losses, the diesel engine is actually only driving the conventional hydraulic pump at 85% of the HP level of 2500 HP due to the parasitic losses. However, the electric driven hydraulic fracking operation 100 may have the single hydraulic pump 160(*a-n*) that is rated at the HP level of 5000 HP, however, the parasitic loads are controlled by equipment running in parallel with the single hydraulic pump 160(*a-n*), thus the single VFD 140(*a-n*) associated with each corresponding single hydraulic pump 160(*a-n*) provides all of its output electric power to the single hydraulic pump 160(*a-n*), the single hydraulic pump 160(*a-n*) actually continuously pumps the fracking media into the well at 5000 HP. Thus, the asset count required for the electric driven hydraulic fracking operation 100 is significantly reduced as compared to the hydraulic fracking operations that incorporate diesel engines due to the lack of parasitic losses for the electric driven hydraulic fracking operation 100.

Further, the conventional hydraulic fracking operations that incorporate diesel engines generate significantly more noise than the electric driven hydraulic fracking operation 100. The numerous diesel engines required in the conventional hydraulic fracking operations generate increased noise levels in that the diesel engines generate noise levels at 110 Dba. However, the gas turbine engines incorporated into the power generation system 110 of the electric driven hydraulic fracking operation 100 generate noise levels that are less than 85 Dba. Often times, the fracking site has noise regulations associated with the fracking site in that the noise levels of the fracking operation cannot exceed 85 Dba. In such situations, an increased cost is associated with the conventional hydraulic fracking operations that incorporate diesel engines in attempts to lower the noise levels generated by the diesel engines to below 85 Dba or having to build sound walls to redirect the noise in order to achieve noise levels below 85 Dba. The electric driven fracking operation 100 does not have the increased cost as the noise levels of the oilfield gas turbine engines include silencers and stacks, thus they already fall below 85 Dba.

Further, the increase in the quantity of conventional hydraulic pumps further increases the asset count which increases the cost as well as the cost of operation of the increase in quantity of conventional hydraulic pumps. Rather than having eight single hydraulic pumps 160(*a-n*) rated at the HP level of 5000 HP to obtain a total HP level of 40000 HP for the fracking site, the conventional hydraulic fracking systems require sixteen conventional hydraulic pumps rated at the HP level of 2500 HP to obtain the total HP level of 40000 HP. In doing so, a significant cost is associated with the increased quantity of conventional hydraulic pumps. Further, conventional hydraulic pumps that fail to incorporate a single VFD 140(*a-n*), a single shaft electric motor 150(*a-n*), and a single hydraulic pump 160(*a-n*) onto a single pump trailer 130(*a-n*) further increase the cost by increasing additional trailers and rigging required to set up the numerous different components at the fracking site. Rather, the electric driven hydraulic fracking operation 100 incorporates the power distribution trailer 120 to consolidate the power generated by the power generation system 110 and then limit the distribution and the cabling required to distribute the electric power to each of the single pump trailers 130(*a-n*).

In addition to the fracking equipment positioned on the fracking trailer 170 that is electrically driven by the electric power generated by the power generation system 110 and each of the VFDs 140(*a-n*), single shaft electric motors 150(*a-n*), and the single hydraulic pumps 160(*a-n*) that are also electrically driven by the electric power generated by the power generation system 110, a plurality of auxiliary systems 190 may be positioned at the fracking site may also be electrically driven by the electric power generated by power generation system 110. The auxiliary systems 190 may assist each of the single hydraulic pumps 160(*a-n*) as well as the fracking equipment positioned on the fracking trailer 170 as each of the hydraulic pumps 160(*a-n*) operate to execute the fracking operation to prepare the well for the later extraction of the fluid from the well. In doing so, the auxiliary systems 190 may be systems in addition to the fracking equipment positioned on the fracking trailer 170 and the single hydraulic pumps 160(*a-n*) that are required to prepare the well for the later execution of the fluid from the well.

For example, the auxiliary systems 190, such as a hydration system that provides adequate hydration to fracking media as the single hydraulic pumps 160(*a-n*) continuously pump the fracking media into the well. Thus, auxiliary systems 190 may include but are not limited to hydration systems, chemical additive systems, blending systems, sand storage and transporting systems, mixing systems and/or any other type of system that is required at the fracking site that is addition to the fracking equipment positioned on the fracking trailer 170 and the single hydraulic pumps 160(*a-n*) that may be electrically driven by the electric power generated by the power generation system 110 that will be apparent to those skilled in the relevant art(s) without departing from the spirit and scope of the disclosure.

The electric power generated by the power generation system 110 may thus be distributed by the power distribution trailer 120 such that the electric power generated by the power generation system 110 may also be incorporated to power the auxiliary systems 190. In doing so, the electric power generated by the power generation system 110 may be incorporated to not only drive the pump trailers 130(a-n) via the single VFDs 140(a-n) positioned on each pump trailer 130(a-n) but to also power the auxiliary systems 190. Thus, the hydraulic fracking operation 100 may be completely electric driven in that each of the required systems positioned on the fracking site may be powered by the electric power generated by the electric power that is consolidated to the power generation system 110.

As noted above, each of the single VFDs 140(a-n) may include a sophisticated control system that may control in real-time the operation of the single shaft electric motors 150(a-n) and the single hydraulic pumps 160(a-n) in order for the single shaft electric motors 150(a-n) and the single hydraulic pumps 160(a-n) to optimally operate to continuously pump the fracking media into the well to execute the fracking operation to prepare the well for the later extraction of the fluid from the well. However, the fracking control center 180 that may be positioned at the fracking site and/or remote from the fracking site may also control the single VFDs 140(a-n) and in doing so control the real-time operation of the single shaft electric motors 150(a-n) and the single hydraulic pumps 160(a-n) in order for the single shaft electric motors 150(a-n) and the single hydraulic pumps 160(a-n) to optimally operate to continuously pump the fracking media into the well to execute the fracking operation to extract the fluid from the well. In doing so, the fracking control center 180 may intervene to control the single VFDs 140(a-n) when necessary. The fracking control center 180 may also control the fracking equipment positioned on the fracking trailer 170 as well as the auxiliary systems 190 in order to ensure that the fracking operation is optimally executed to prepare the well for the later extraction of the fluid from the well.

Communication between the fracking control center 180 and the single VFDs 140(a-n), the fracking equipment positioned on the fracking trailer 170, and/or the auxiliary systems 190 may occur via wireless and/or wired connection communication. Wireless communication may occur via one or more networks 105 such as the internet or Wi-Fi wireless access points (WAP. In some embodiments, the network 105 may include one or more wide area networks (WAN) or local area networks (LAN). The network may utilize one or more network technologies such as Ethernet, Fast Ethernet, Gigabit Ethernet, virtual private network (VPN), remote VPN access, a variant of IEEE 802.11 standard such as Wi-Fi, and the like. Communication over the network 105 takes place using one or more network communication protocols including reliable streaming protocols such as transmission control protocol (TCP), Ethernet, Modbus, CanBus, EtherCAT, ProfiNET, and/or any other type of network communication protocol that will be apparent from those skilled in the relevant art(s) without departing from the spirit and scope of the present disclosure. Wired connection communication may occur but is not limited to a fiber optic connection, a coaxial cable connection, a copper cable connection, and/or any other type of direct wired connection that will be apparent from those skilled in the relevant art(s) without departing from the spirit and scope of the present disclosure. These examples are illustrative and not intended to limit the present disclosure.

Electric Power Distribution

Figure 3:
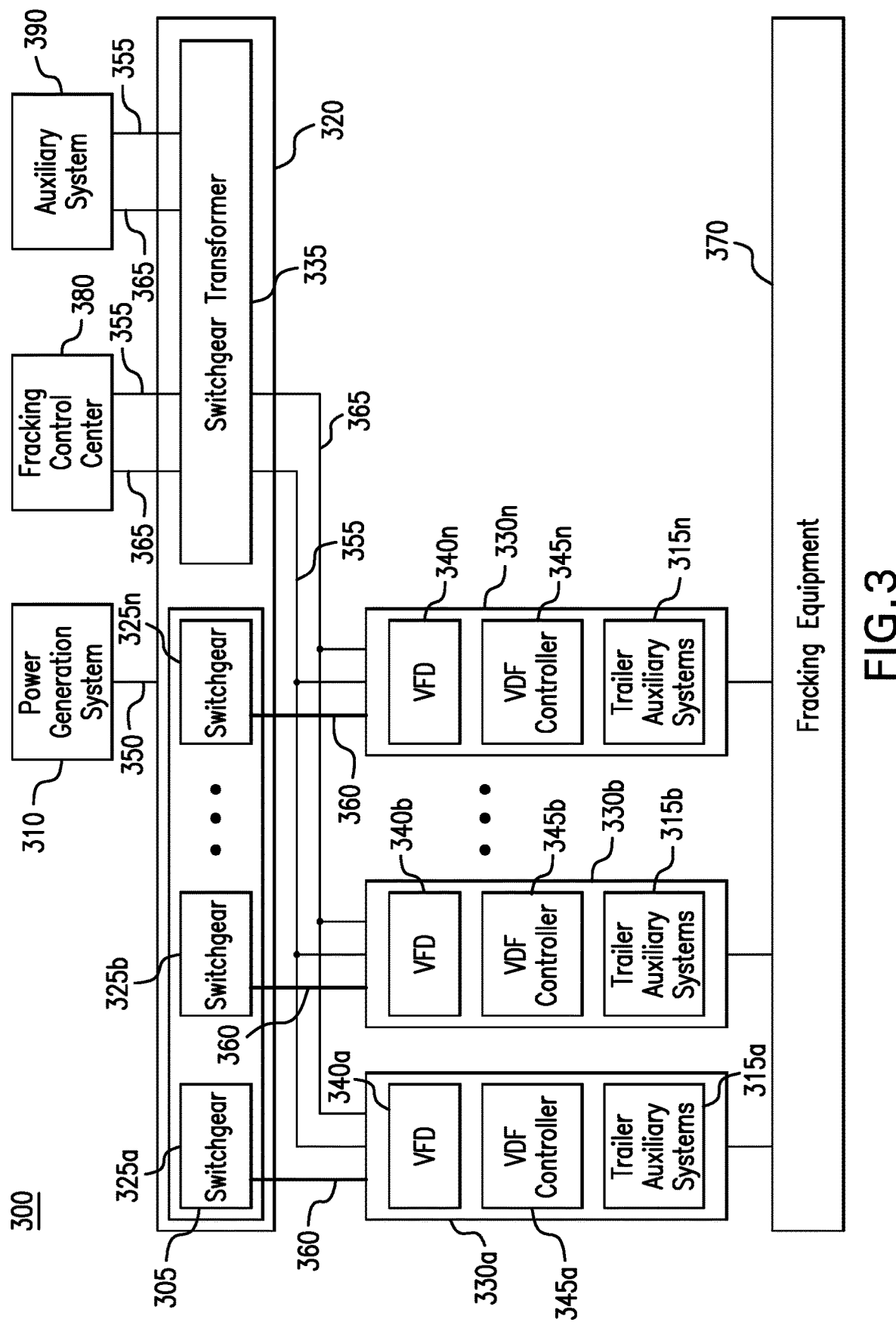
FIG. 3 illustrates a block diagram of an electric driven hydraulic fracking system that provides an electric driven system to execute a fracking operation in that the electric power is consolidated in a power generation system and then distributed such that each component in the electric driven hydraulic fracking system is electrically powered.

FIG. 3 illustrates a block diagram of an electric driven hydraulic fracking system that provides an electric driven system to execute a fracking operation in that the electric power is consolidated in a power generation system and then distributed such that each component in the electric driven hydraulic fracking system is electrically powered. An electric driven hydraulic fracking system 300 includes a power generation system 310, a power distribution trailer 320, a plurality of pump trailers 330(a-n), a plurality of single VFDs 340(a-n), a switchgear configuration 305, a plurality of trailer auxiliary systems 315(a-n), a plurality of switchgears 325(a-n), a switchgear transformer configuration 335, and fracking equipment 370. The electric power is consolidated in the power generation system 310 and then distributed at the appropriate voltage levels by the power distribution trailer 320 to decrease the medium voltage cabling required to distribute the electric power. The single VFDs 340(a-n) and the trailer auxiliary systems 315(a-n) positioned on the pump trailers 330(a-n) as well as the fracking control center 380 and auxiliary systems 390 are electrically powered by the electric power that is consolidated and generated by the power generation system 310. The electric driven hydraulic fracking system 300 shares many similar features with the hydraulic fracking operation 100 and the single pump configuration 200; therefore, only the differences between the electric driven hydraulic fracking system 300 and the hydraulic fracking operation 100 and single pump configuration 200 are to be discussed in further detail.

As noted above, the power generation system 310 may consolidate the electric power 350 that is generated for the electric driven hydraulic fracking system 300 such that the quantity and size of the power sources included in the power generation system 310 is decreased. As discussed above, the power generation system 310 may include numerous power sources as well as different power sources and any combination thereof. For example, the power generation system 310 may include power sources that include a quantity of gas turbine engines. In another example, the power generation system 310 may include a power source that includes an electric utility power plant that independently generates electric power for an electric utility grid. In another example, the power generation system 310 may include a combination of gas turbine engines and an electric utility power plant. The power generation system 310 may generate the electric power 350 at a power level and a voltage level.

The power generation system 310 may generate electric power at a power generation voltage level in which the power generation voltage level is the voltage level that the power generation system is capable of generating the electric power 350. For example, the power generation system 310 when the power sources of the power generation system 310 include a quantity of gas turbine engines may generate the electric power 350 at the voltage level of 13.8 kV which is a typical voltage level for electric power 350 generated by gas turbine engines. In another example, the power generation system 310 when the power sources of the power generation system include an electric power plan may generate the electric power 350 at the voltage level of 12.47 kV which is a typical voltage level for electric power 350 generated by an electric utility power plant. The power generation system may generate the electric power 350 at any voltage level that is provided by the power sources included in the power generation system 310 that will be apparent to those skilled in the relevant art(s) without departing from the spirit and scope of the disclosure. The power generation system 310 may then provide the electric power 350 at the power generation voltage level to the power distribution trailer 320 via a medium voltage cable.

In continuing for purposes of discussion, the power distribution trailer 320 may then distribute the electric power 350 at the power generation voltage level to a plurality of single VFDs 340(a-n), where n is an integer equal to or greater than two, with each single VFD 340(a-n) positioned on a corresponding single trailer 330(a-n) from a plurality of single trailers, where n is an integer equal to or greater than two. The power distribution trailer 320 may include a switchgear configuration 305 that includes a plurality of switchgears 325(a-n), where n is an integer equal to or greater than two, to distribute the electric power 350 generated by the at least one power source included in the power distribution trailer 310 at the power generation voltage level 360 to each corresponding single VFD 340(a-n) positioned on each corresponding trailer 330(a-n).

Since the electric power 350 is consolidated to the power generation system 310, the switch gear configuration 305 of the power distribution trailer 320 may distribute the electric power 350 at the power generation voltage level as generated by the power generation system 310 to each of the single VFDs 340(a-n) as electric power 360 at the power generation voltage level such that the each of the single VFDs 340(a-n) may then drive the single shaft electric motors and the single hydraulic pumps as discussed in detail below. For example, the switch gear configuration 305 of the power distribution trailer 320 may distribute the electric power 350 at the power generation voltage level of 13.8 kV to each of the single VFDs 340(a-n) as electric power 360 at the power generation voltage level of 13.8 kV when the power distribution system 310 has power sources that include gas turbine engines. In another example, the switch gear configuration 305 of the power distribution trailer 320 may distribute the electric power 350 at the power generation level of 12.47 kV to each of the single VFDs 340(a-n) as electric power 360 at the power generation level of 12.47 kV when the power distribution 310 has power sources that include an electric utility power plant.

In order for the electric power to be consolidated to the power generation system 310 as well as to provide an electric driven system in which each of the components of the electric driven hydraulic fracking system 300 is driven by the electric power generated by the power generation system 310, the power distribution trailer 320 provides the flexibility to distribute the electric power 350 generated by the power generation system 310 at different voltage levels. In adjusting the voltage levels that the electric power 350 generated by the power generation system 310 is distributed, the power distribution trailer 320 may then distribute the appropriate voltage levels to several different components included in the electric driven hydraulic fracking system 300 to accommodate the electric power requirements of the several different components included in the electric driven hydraulic fracking system 300. For example, the power distribution trailer 320 may distribute the electric power 360 generated by the power generation system 310 at the voltage level of 13.8 kV as generated by the power generation system 310 via the switch gears 325(a-n) to each of the single VFDs 340(a-n) for the each of the single VFDs 340(a-n) to drive the single shaft electric motors and the single hydraulic pumps. In another example, the power distribution trailer 320 may distribute the electric power 360 generated by the power generation system 310 at the voltage level of 12.47 kV as generated by the power generation system 310 via the switch gears 325(a-n) to each of the single VFDs 340(a-n) for each of the single VFDs 340(a-n) to drive the single shaft electric motors and the single hydraulic pumps.

However, the electric power distribution trailer 320 may also distribute the electric power 350 generated by the power generation system 310 at a decreased voltage level from the voltage level of the electric power 350 originally generated by the power generation system 310. Several different components of the electric driven hydraulic fracking system 300 may have power requirements that require electric power at a significantly lower voltage level than the electric power 350 originally generated by the power generation system 310. In doing so, the power distribution trailer 320 may include a switchgear transformer configuration 335 that may step-down the voltage level of the electric power 350 as originally generated by the power distribution trailer 310 to a lower voltage level that satisfies the power requirements of those components that may not be able to handle the increased voltage level of the electric power 350 originally generated by the power distribution trailer 310. In doing so, the electric power distribution trailer 320 may provide the necessary flexibility to continue to consolidate the electric power 350 to the power generation system 310 while still enabling each of the several components to be powered by the electric power generated by the power generation system 310.

For example, the switchgear transformer configuration 335 may convert the electric power 350 generated by the at least one power source of the power generation system 310 at the power generation voltage level to at an auxiliary voltage level that is less than the power generation voltage level. The switchgear transformer configuration 335 may then distribute the electric power 355 at the auxiliary voltage level to each single VFD 340(a-n) on each corresponding single trailer 330(a-n) to enable each single VFD 340(a-n) from the plurality of single VFDs 340(a-n) to communicate with the fracking control center 380. The switchgear transformer configuration 335 may also distribute the electric power 355 at the auxiliary voltage level to a plurality of auxiliary systems 390. The plurality of auxiliary systems 390 assists each single hydraulic pump as each hydraulic pump from the plurality of single hydraulic pumps operate to prepare the well for the later extraction of the fluid from the well.

In such an example, the switchgear transformer configuration 335 may convert the electric power 350 generated by the power generation system 310 with power sources include gas turbine engines at the power generation voltage level of 13.8 kV to an auxiliary voltage level of 480V that is less than the power generation voltage level of 13.8 kV. The switchgear transformer configuration 335 may then distribute the electric power 355 at the auxiliary voltage level of 480V to each single VFD 340(a-n) on each corresponding single trailer 330(a-n) to enable each single VFD 340(a-n) from the plurality of single VFDs 340(a-n) to communicate with the fracking control center 380. The switchgear transformer configuration 335 may also distribute the electric power 355 at the auxiliary voltage level of 480V to a plurality of auxiliary systems 390. In another example, the switchgear transformer configuration 335 may convert the electric power 350 generated by the power generation system 310 with power sources that include an electric utility power plant at the power generation voltage level of 12.47 kV to an auxiliary voltage level of 480V that is less than the power generation voltage level of 12.47 kV. In another example, the switchgear transformer configuration 33 may convert the electric power 350 at the power generation voltage level generated by the power generation system 310 to the auxiliary voltage level of 480V, 120V, 24V and/or any other auxiliary voltage level that is less than the power generation voltage level. The switchgear transformer configuration 335 may convert the electric power 350 at the power generation voltage level generated by the power generation system 310 to any auxiliary voltage level that is less than the power generation voltage level to assist each single VFD 340(*a-n*) in executing operations that do not require the electric power 360 at the power generation voltage level that will be apparent to those skilled in the relevant art(s) without departing from the spirit and scope of the disclosure.

Unlike each of the single VFDs 340(*a-n*) that may convert the electric power 360 at the power generation voltage level to drive the single shaft electric motors and the single hydraulic pumps, the fracking control center 380, the auxiliary systems 390, the trailer auxiliary systems 315(*a-n*) as well as the operation of features of the single VFDS 340(*a-n*) that are unrelated to the driving of the single shaft electric motors and the single hydraulic pumps require the electric power to be stepped down to the electric power 355 at the auxiliary voltage level. The switchgear transformer configuration 335 may provide the necessary flexibility to step-down the electric power 360 at the power generation voltage level to the generate the electric power 355 at the auxiliary voltage level such that the remaining components of the electric driven hydraulic fracking system 300 may also be electrically driven by the electric power consolidated to the power generation system 310.

In stepping down the electric power 350 generated by the power generation system 310 at the power generation voltage level, the switchgear transformer configuration 335 may provide the electric power 355 at the auxiliary voltage level to the auxiliary systems 390. In doing so, the auxiliary systems 390 may be electrically driven by the electric power 355 at the auxiliary voltage level such that the electric power consolidated by the power generation system 310 may drive the auxiliary systems 390. The auxiliary systems 390 may include but are not limited hydration systems, chemical additive systems, fracturing systems, blending systems, mixing systems and so on such that each of the auxiliary systems 390 required to execute the fracking operation may be electrically driven by the electric power consolidated by the power generation system 310. Further, the power distribution trailer 320 may also route a communication link 365 to each of the auxiliary systems 390 such that the fracking control center 380 may intervene and control each of the auxiliary systems 390 via the communication link 365 if necessary.

The switchgear transformer configuration 335 may also provide the electric power 355 at the auxiliary voltage level to the fracking control center 380. In providing the auxiliary voltage level to the fracking control center 380, the fracking control center 380 may remotely control the auxiliary systems 390, the single VFDs 340(*a-n*), as well as the trailer auxiliary systems 315(*a-n*) as requested by the fracking control center 380. The power distribution trailer 320 may route the communication link 365 to the auxiliary systems 390, the single VFDs 340(*a-n*), and the trailer auxiliary systems 315(*a-n*) such that the fracking control center 380 may communicate with each of the auxiliary systems 390, the single VFDs 340(*a-n*), and the trailer auxiliary systems 315(*a-n*) and thereby control via the communication link 365. As discussed above, the communication link 365 may be a wireline and/or wireless communication link.

The switchgear transformer configuration 335 may also provide the electric power 355 at the auxiliary voltage level to each of the single VFDs 340(*a-n*). As discussed above and below, the single VFDs 340(*a-n*) convert the electric power 360 generated by the power generation system 310 at the power generation voltage level to drive the single shaft electric motors and the single hydraulic pumps. However, the single VFD 340(*a-n*) may also operate with different functionality without having to drive the single shaft electric motors and the single hydraulic pumps. For example, the auxiliary systems 315(*a-n*) positioned on the pump trailers 330(*a-n*) and/or included in the single VFDs 340(*a-n*) may operate as controlled by a corresponding VFD controller 345(*a-n*) that is positioned on the corresponding single trailer 330(*a-n*) and associated with the corresponding single VFD 340(*a-n*).

In doing so, the single VFD controllers 345(*a-n*) may operate the auxiliary systems 315(*a-n*) when the single VFD 340(*a-n*) is simply provided the electric power 355 at the auxiliary voltage level rather than having to operate with the electric power 360 at the power generation voltage level. In doing so, the fracking control center 380 may also communicate with the VFD controllers 345(*a-n*) and the single VFDs 340(*a-n*) as well as the trailer auxiliary systems 315(*a-n*) via the communication link 365 when the stepped-down electric power 355 at the auxiliary voltage level is provided to each of the single VFDs 340(*a-n*). In addition to operating auxiliary systems 315(*a-n*) when the corresponding single VFD 340(*a-n*) is provided the electric power 355 at the auxiliary voltage level, the VFD controller 345(*a-n*) may also operate the trailer auxiliary systems 315(*a-n*) as well as control the corresponding single shaft electric motor 150(*a-n*) that then drives each of the corresponding hydraulic pumps 160(*a-n*) to continuously pump the fracking media into the well to execute the fracking operation to extract the fluid from the well when the electric power 360 at the power generation voltage level is provided to the single VFDs 340(*a-n*).

For example, the single VFDs 340(*a-n*) may operate at a reduced capacity when the switchgear transformer configuration 335 provides the electric power 355 at the auxiliary voltage level. In doing so, the single VFDs 340(*a-n*) may operate in a maintenance mode in which the electric power 355 at the auxiliary voltage level is sufficient for the single VFDs 340(*a-n*) to spin the single shaft electric motors but not sufficient to drive the single shaft electric motors at the RPM levels that the single shaft electric motors are rated. In operating the single VFDs 340(*a-n*) in the maintenance mode with the electric power 355 at the auxiliary voltage level, the hydraulic pumps as well as the fracking equipment 370 may be examined and maintenance may be performed on the hydraulic pumps and the fracking equipment 370 to ensure the hydraulic pumps 160(*a-n*) and the fracking equipment 370 are operating adequately. The VFD controllers 345(*a-n*) of the single VFDs 340(*a-n*) may execute the functionality of the single VFDs 340(*a-n*) when operating in the maintenance mode. The fracking control center 380 may also remotely control the single VFDs 340(*a-n*) via the communication link 365 to execute the functionality of the single VFDs 340(*a-n*) when operating in the maintenance mode.

In another example, the trailer auxiliary systems 315(*a-n*) may be operated when the single VFDs 340(*a-n*) are operating at the reduced capacity when the switchgear transformer configuration 335 provides the electric power 355 at the auxiliary voltage level. The trailer auxiliary systems 315(*a-n*) may be auxiliary systems positioned on the pump trailers 330(*a-n*) and/or included in the single VFDs 340(*a-n*) such that auxiliary operations may be performed on the single VFDs 340(*a-n*), the single shaft electric motors, and/or the single hydraulic pumps to assist in the maintenance and/or operation of the single VFDs 340(*a-n*) the single shaft electric motors and/or single hydraulic pumps when the electric power 355 at the auxiliary voltage level is provided to the single VFDs 340(*a-n*). For example, the trailer auxiliary systems 315(*a-n*) may include but are not limited to motor blower systems, the lube oil controls, oil heaters, VFD fans, and/or any other type of auxiliary system that is positioned on the pump trailers 330(*a-n*) and/or included in the single VFDs 340(*a-n*) to assist in the maintenance and/or operation of the single VFDs 340(*a-n*), single shaft electric motors, and/or single hydraulic pumps that will be apparent to those skilled in the relevant art(s) without departing from the spirit and scope of the disclosure.

VFD Configuration and Control

Returning to the electric power 350 that is generated by the power generation system 310 at the power generation voltage level and then distributed by the power distribution trailer 320 as the electric power 360 at the power generation voltage level to the single VFDs 340(*a-n*), the single VFDs 340(*a-n*) may convert electric power 360 at the power generation voltage level to a VFD voltage level that is adequate to drive the single shaft electric motors. As noted above for example, the single VFDs 340(*a-n*) may convert the electric power 360 at the power generation voltage level to a VFD voltage level at a range 0V to 6900V to adequately drive the single shaft electric motors. In a specific embodiment the single VFDs 340(*a-n*) may convert the electric power at the power generation voltage level to a VFD voltage level of 4160V to adequately drive the single shaft electric motors. In another embodiment, the single VFDs 340(*a-n*) may convert the electric power 360 at the power generation voltage level to a VFD voltage level at a range of 4160V and greater.

In another embodiment, the single VFDs 340(*a-n*) may convert the electric power 360 at the power generation voltage level to a VFD voltage level at a range of at least 4160V to adequately drive the single shaft electric motors. The single VFDs 340(*a-n*) may convert the electric power 360 at the power generation voltage level to any VFD voltage level to adequately drive the single shaft electric motors that will be apparent to those skilled in the relevant art(s) without departing from the spirit and scope of the disclosure. Each single VFD 340(*a-n*) may include a phase shifting transformer that enables each single VFD 340(*a-n*) to operate as a multi-cell VFD configuration. The multi-cell VFD configuration of each single VFD 340(*a-n*) may enable each single VFD 340(*a-n*) to transition the AC voltage signal 360 that is associated with the power generation voltage level as distributed by the power distribution trailer 320 to a VFD voltage signal that is associated with the VFD voltage level.

Many conventional VFDs fail to adequately apply a sufficient amount of phase changing sinusoidal signals to the conversion of the AC voltage signal 360 at the power generation voltage level to the VFD voltage signal at the VFD voltage level to achieve adequate levels of harmonic mitigation as the single VFDs 340(*a-n*) operate to drive the corresponding single shaft electric motors and single shaft hydraulic pumps at the VFD voltage level when executing the fracking operation. In an embodiment, the adequate elimination of harmonics from the operation of the VFD current waveform at the VFD voltage level is dictated by IEEE-519 that mandates the level of total harmonic distortion that is allowed in the VFD current waveform. Harmonics present in the VFD current waveform that exceed the level of total harmonic distortion allowed by IEEE-519 is an excessive level of harmonics that are routinely produced by the conventional VFDs. Harmonics present in the VFD current waveform that are below the level of total harmonic distortion allowed by IEEE-519 results in having an adequate level of harmonic mitigation. The level of harmonic mitigation such that the level of total harmonic distortion is at an adequate level may be any adequate level that is acceptable to a power generation system 310 that is providing power to the electric driven hydraulic fracking system 300 that will be apparent to those skilled in the relevant art(s) without departing from the spirit and scope of the disclosure.

Thus, the conventional VFDs in often failing to adequately mitigate the level of harmonics when converting the AC voltage signal 360 at the power generation voltage level to generate the VFD voltage signal at the VFD voltage level may result in the VFD current waveform failing IEEE-519. In doing so, the excess quantity of harmonics present in the conventional VFD current waveform propagate back through the AC voltage signal 360 provided by the power distribution trailer 320 as well as propagate back through the electric power 350 provided by the electric power generation system 310. The propagation of the excess quantity of harmonics back through to the electric power 350 provided by the electric power generation system 310 may impose significant inefficiency and may reduce the available level of the electric power 350 provided by the electric power generation system 310 to the single hydraulic pumps 260 and all other applications outside of the electric driven hydraulic fracking system 300 as well as cause thermal damage to the electric power distribution architecture of the electric power generation system 310 such as power lines, power cables and so on.

Rather than simply applying a limited amount of phase changing signals to the AC voltage signal 360 at the power generation voltage level to generate the VFD voltage signal at the VFD voltage level, the phase shifting transformer included in the single VFDs 340(*a-n*) provides a significant amount of phase shifted signals to the AC voltage signal 360 to transition the AC voltage signal 360 to the VFD voltage signal. The plurality of sinusoidal signals with each sinusoidal signal having a phase shift relative to each other may significantly decrease the quantity of harmonics caused in the VFD current waveform as the VFDs 340(*a-n*) drive the corresponding single shaft electric motor and single hydraulic pump at the VFD voltage level. In doing so, the quantity of total harmonic distortion allowed in the VFD current waveform by IEEE-519 may be satisfied due to the decreased quantity of harmonics content in the VFD current waveform.

Figure 4:
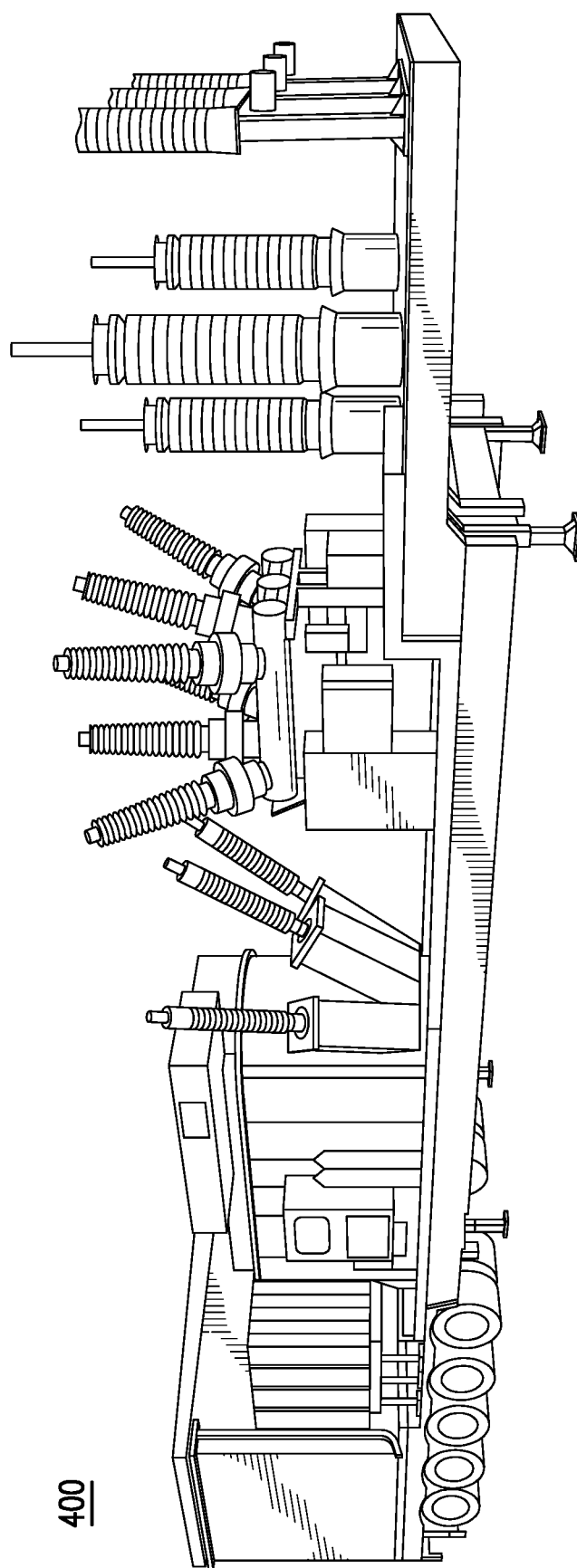
FIG. 4 illustrates a top-elevational view of a mobile substation for electric power provided by the electric utility grid as the power generation system.

In reducing the harmonics, the VFDs 340(*a-n*) assists to assure an acceptable decreased level of harmonic content at the point of common coupling such that the VFDs 340(*a-n*) may couple to an electric utility power plant such that the electric utility power plant may be the power generation system 310 and may provide the AC voltage signal 360 at the voltage level of 12.47 kV to the VFDs 340(*a-n*). The electric utility power plant generates electric power for an electric utility grid. The VFDs 340(*a-n*) in reducing the harmonics also assist to mitigate the risk that the harmonic content may propagate onto the electric utility grid thereby satisfying the criteria necessary for the electric utility power plant to act as the power generation system 310. Further, the reduction of the harmonics enables the VFDs 340(*a-n*) to operate at an improved power factor which throughout the complete load range thereby further reducing the cost for having the electric utility power plant to provide power to the VFDs 340(*a-n*) as the power generation system 310. For example, FIG. 4 illustrates a top-elevational view of a mobile substation for electric power provided by the electric utility power plant as the power generation system 310. In doing so, an electric utility power plant configuration 400 may act as the power generation system 310 and/or in a combination with at least one gas turbine engine as the power generation system 310 due to the elimination of the harmonics and the operation at an improved power factor by the VFDs 340(*a-n*).

More specifically, FIG. 5 illustrates a block diagram of an electric driven hydraulic fracking system that provides an electric driven system to execute a fracking operation in that a VFD configuration includes a plurality of VFD cells that are isolated in order to generate the electric power at the VFD voltage level to drive the single shaft motor. An electric driven hydraulic fracking system 500 includes a VFD configuration 510 and a single shaft electric motor 530. The VFD configuration 510 includes a plurality of VFD cells 520(*a-n*), where n is an integer greater than one, a VFD transformer 540, a VFD relay 505, and a VFD controller 515. The VFD transformer 540 operates as a passive means for phase-shifting the three phase power source in that the VFD transformer 540 provides the electric power 360 at the power generation voltage level as 3-phase sinusoidal AC electric power with a first phase 360*a*, a second phase 360*b*, and a third phase 360*c* to each VFD cell 520(*a-n*) and each VFD cell 520(*a-n*) then converts the 3-phase sinusoidal AC electric power 360(*a-c*) to AC electric power 550 at the VFD voltage level to drive the single shaft electric motor 530 based on the phase shifting of the VFD transformer 540. The electric driven hydraulic fracking system 500 shares many similar features with the hydraulic fracking operation 100, the single pump configuration 200, and the electric driven hydraulic fracking system 300; therefore, only the differences between the electric driven fracking system 500 and the hydraulic fracking operation 100, the single pump configuration 200, and the electric driven hydraulic fracking system 300 are to be discussed in further detail.

The VFD configuration 510 includes the VFD cells 520 (*a-n*) in which each of the VFD cells 520(*a-n*) are isolated from each other. The VFD cells 520(*a-n*) are isolated from each other in that the VFD transformer 540 may provide the electric power 360 at the power generation voltage level to each VFD cell 520(*a-n*) as the 3-phase sinusoidal AC electric power 360(*a-c*) individually as input power to each VFD cell 520(*a-n*). For example, the VFD transformer 540 may provide the first phase 360*a*, the second phase 360*b*, and the third phase 360*c* of the 3-phase AC sinusoidal electric power 360(*a-c*) to the VFD cell 520*a* as input power. The VFD transformer 540 may provide the first phase 360*a*, the second phase 360*b*, and the third phase 360*c* of the 3-phase AC sinusoidal electric power 360(*a-c*) to the VFD cell 520*b* as input power. The VFD transformer 540 may provide the first phase 360*a*, the second phase 360*b*, and the third phase 360*c* of the 3-phase AC sinusoidal electric power 360(*a-c*) to the VFD cell 520*n* as input power and so on to each of the VFD cells 520(*a-n*) included in the VFD configuration 510.

Each of the VFD cells 520(*a-n*) are further isolated from each other in that each of the VFD cells 520(*a-n*) include a plurality of windings. Each of the windings associated with each corresponding VFD cell 520(*a-n*) enables each VFD cell 520(*a-n*) to receive the 3-phase AC sinusoidal electric power 360(*a-c*) as input power and then output electric power 560 at a VFD cell voltage level. In doing so, the electric power 560 at the VFD cell voltage level that is generated as an output by each VFD cell 520(*a-n*) is isolated from each other output of the electric power 560 at the VFD cell voltage level of each other VFD cell 520(*a-n*). The isolation of the output of the electric power 560 at the VFD cell voltage level of each VFD cell 520(*a-n*) may enable the 3-phase AC sinusoidal electric power 360(*a-c*) to be segmented into numerous different partitions based on the windings associated with each VFD cell 520(*a-n*). As the windings associated with each VFD cell 520(*a-n*) increase, the quantity of different partitions that each VFD cell 520(*a-n*) may segment the 3-phase AC sinusoidal electric power 360(*a-c*) into also increases.

The segmenting of the 3-phase AC sinusoidal electric power 360(*a-c*) by the windings associated with each of the VFD cells 520(*a-n*) may enable each of the VFD cells 520(*a-n*) to generate partitions of the 3-phase AC sinusoidal electric power 360(*a-c*) in the electric power 560 at the VFD cell voltage level that may then be reconnected into a configuration to generate the electric power 550 as a AC sinusoidal signal at the VFD voltage level. For example, each of the VFD cells 520(*a-n*) may segment the 3-phase AC sinusoidal electric power 360(*a-c*) by windings associated with each of the VFD cells 520(*a-n*) to generate partitions of the 3-phase AC sinusoidal electric power 360(*a-c*) as provided as the electric power 560 at the VFD cell voltage level of 750V.

In such an example, each of the VFD cells 520(*a-n*) may include windings that may segment the 3-phase AC sinusoidal electric power 360(*a-c*) at the power generation voltage level, of 13.8 kV for example, to partitions of electric power 560 at the VFD cell voltage level of 750V. The isolation of each of the VFD cells 520(*a-n*) may then enable the single VFD configuration 510 to then reconnect into a configuration of each of the partitions of electric power 560 at the VFD cell voltage level of 750V to generate the electric power 550 as a AC sinusoidal signal at the VFD voltage level of 4160V which is necessary to drive the single shaft electric motor 530 in this example. The VFD cells 520(*a-n*) may segment the 3-phase AC sinusoidal electric power 360(*a-c*) at the power generation voltage level into partitions of the electric power 560 at the VFD cell voltage level at any VFD cell voltage level that may be reconnected into a configuration to generate the electric power 550 as a AC sinusoidal signal at the VFD voltage level required to adequately drive the single shaft electric motor 530 to execute the fracking operation that will be apparent to those skilled in the relevant art(s) without departing from the spirit and scope of the disclosure.

The segmenting of the 3-phase AC sinusoidal electric power 360(*a-c*) by the windings associated with each of the VFD cells 520(*a-n*) may also enable each of the VFD cells 520(*a-n*) to generate partitions of the 3-phase AC sinusoidal electric power 360(*a-c*) in the electric power 560 at the VFD cell voltage level that may then be reconnected into a configuration to generate the electric power 550 as a AC sinusoidal signal at the VFD voltage level with increased smoothness. As noted above, the increased quantity of windings associated with each of the VFD cells 520(*a-n*) may result in each of the VFD cells 520(*a-n*) generating an increase in partitions of the segmented 3-phase AC sinusoidal electric power 360(*a-c*) as provided in the electric power 560 at the VFD cell voltage level. The subsequent reconnecting into a configuration of the partitions of the segmented 3-phase AC sinusoidal electric power 360(*a-c*) as generated by the VFD cells 520(*a-n*) as the electric power 560 at the VFD cell voltage level may then generate the electric power 550 as a AC sinusoidal signal at the VFD voltage level with an increased smoothness.

As the partitions of the segmented 3-phase AC sinusoidal electric power 360(*a-c*) as provided by the electric power 560 at the VFD cell voltage level are reconnected into a configuration to generate the electric power 550 as a AC sinusoidal signal at the VFD voltage level, the smoothness of the electric power 550 as the AC sinusoidal signal is impacted based on the quantity of partitions generated by each of the VFD cells 520(*a-n*) of the segmented 3-phase AC sinusoidal electric power 360(*a-c*). As the partitions generated by each of the VFD cells 520(*a-n*) of the segmented 3-phase AC sinusoidal electric power 360(*a-c*) due to the isolation of the VFD cells 520(*a-n*) increases, the smoothness of the electric power 550 as the AC sinusoidal signal also increases. As the partitions generated by the each of the VFD cells 520(*a-n*) of the segmented 3-phase AC sinusoidal electric power 360(*a-c*) decreases, the smoothness of the electric power 550 as the AC sinusoidal signal also decreases. As mentioned above and will be discussed in detail below, the increase in smoothness of the electric power 550 as the AC sinusoidal signal decreases the quantity of harmonics present in the VFD current waveform of the electric power 550 at the VFD voltage level.

The VFD transformer 540 may provide a phase shift to each of the partitions of the segmented 3-phase AC sinusoidal electric power 360(*a-c*) as provided by the electric power 560 at the VFD cell voltage level as the partitions are reconnected into a configuration to generate the electric power 560 as the AC sinusoidal signal at the VFD voltage level. The phase shifting of the each of the partitions of the segmented 3-phase AC sinusoidal electric power 360(*a-c*) as generated by each of the VFD cells 520(*a-n*) by the VFD transformer 540 due to the isolation of each of the VFD cells 520(*a-n*) may further increase the smoothness of the electric power 550 as the AC sinusoidal signal. The VFD transformer 540 may phase shift each of the partitions relative to each other such that the smoothness of the electric power 550 as the AC sinusoidal signal is increased thereby decreasing the quantity of harmonics present in the VFD current waveform of the electric power 550 at the VFD voltage level.

For example, the electric power 360 distributed by the power distribution trailer may be at a power generation voltage level of 12.47 kV. The VFD transformer 540 may then provide the electric power 360 at the power generation voltage level of 12.47 kV to each of the VFD cells 520(*a-n*) as three-phase AC sinusoidal electric power 360(*a-c*). Each VFD cell 520(*a-n*) may include numerous windings. In such an example, the quantity of windings included in each VFD cell 520(*a-n*) may segment the three-phase AC sinusoidal electric power 360(*a-c*) at the power generation voltage level of 12.47 kV into several different partitions such that each of the partitions are at a VFD cell voltage level of 0.2*12.47 kV. In such an example, each of the partitions of the segmented three-phase AC sinusoidal electric power 360(*a-c*) for each corresponding VFD cell when reconnected into a configuration may have a VFD cell voltage level of 750V for each VFD cell 520(*a-n*).

The single VFD configuration 510 may then reconnect into a configuration each of the partitions that the windings included in each VFD cell 520(*a-n*) of the segmented three-phase AC sinusoidal electric power 360(*a-c*) at the VFD cell voltage level of 0.2*12.47 kV to generate the electric power 550 at the VFD voltage level of 4160V in this example that is sufficient to drive the single shaft electric motor 530. The single VFD configuration 510 may also reconnect into a configuration each of the partitions that the windings included in each VFD cell 520(*a-n*) provided at the VFD cell voltage level of 0.2*12.47 kV to generate the AC sinusoidal electric power 550 at the VFD voltage level such that the increased quantity of partitions increases the smoothness of the AC sinusoidal electric power 550.

In doing so, the single VFD configuration 510 may reconnect the increased quantity of partitions into a configuration that increases the smoothness of the AC sinusoidal electric power to a threshold that decreases the quantity of total harmonics present in the VFD current waveform of the AC sinusoidal electric power 550. As a result, the quantity of total harmonic distortion allowed in the VFD current waveform of the AC sinusoidal electric power 550 by IEEE-519 may be satisfied due to the decreased quantity of harmonics in the VFD current waveform of the electric power 550. Further, the VFD transformer 540 may phase shift the increased quantity of partitions of the segmented three-phase AC sinusoidal electric power 360(*a-c*) generated by each of the windings included in each of the VFD cells 520(*a-n*) at the VFD cell voltage level of 0.2*12.47 kV such that the partitions are further reconnected into a configuration to also increase the smoothness of the AC sinusoidal electric power 550 to a threshold thereby decreasing the quantity of total harmonics present in the VFD current waveform of the AC sinusoidal electric power 550. As a result, the quantity of total harmonic distortion allowed in the VFD current waveform of the AC sinusoidal electric power 550 by IEEE-519 may further be satisfied due to the decreased quantity of harmonics in the current waveform of the electric power 550.

However, the windings included in each of the VFD cells 520(*a-n*) provides flexibility as to the frequency and the VFD voltage level of the of the electric power 550. In doing so, the single VFD configuration 510 is not limited in generating the electric power 550 at a single VFD voltage level and frequency, such as 4160V at 60 Hz. Rather, the windings included in each of the VFD cells 520(*a-n*) enable the single VFD configuration 510 to reconnect into a configuration the partitions of the segmented three-phase AC sinusoidal electric power 360(*a-n*) that customizes the single VFD voltage level and frequency of the electric power 550 to drive the single shaft electric motor 530. In doing so, the single VFD voltage level and frequency of the electric power 550 may be decreased from the single VFD voltage level and frequency of 4160V at 60 Hz as well as the single VFD voltage level and frequency of the electric power 550 may be increased from the single VFD voltage level of 4160V frequency at 60 Hz.

The increased quantity of partitions generated by the windings of each VFD cell 520(*a-n*) that segment the three-phase AC sinusoidal electric power 360(*a-n*) into the electric power 560 at the VFD cell voltage level for each VFD cell 520(*a-n*) results in a sufficient amount of phase changing sinusoidal signals represented in the partitions to convert the three-phase sinusoidal AC signal 360(*a-c*) at the power generation voltage level to the VFD voltage signal 550 at the VFD voltage level to achieve adequate levels of harmonic mitigation as the single VFD configuration 510 operates to drive the single shaft electric motor 530 when executing the fracking operation. As noted above, the adequate elimination of harmonics from the operation of the VFD current waveform of the electric power 550 at the VFD voltage level is dictated by IEEE-519 that mandates the total harmonic distortion that is allowed in the VFD current waveform of the electric power 550 at the VFD voltage level when driving the single shaft electric motor 530.

In decreasing the excess quantity of harmonics present on the VFD current waveform of the electric power 550 at the VFD voltage level due to the increased quantity of partitions of the segmented three-phase AC sinusoidal signal 360(a-c) as well as the phase shifting of such partitions, any excess quantity of harmonics present in the VFD current waveform of the electric power 550 that propagate back through the AC sinusoidal electric power 360 is sufficiently decreased to limit disruption and minimize additional excess heat which is created by harmonics to the power generation system, such as the electric utility power grid. Further, decreasing the excess quantity of harmonics present on the VFD current waveform of the electric power 550 at the VFD voltage level due to the increased quantity of partitions of the segmented three-phase sinusoidal signal 360(a-c) as well as the phase shifting of such partitions may also sufficiently decrease the quantity of harmonics present in the VFD current waveform of the electric power to prevent significant inefficiency and the reduction of the available level of electric power 350 provided by the power generation system 310 to the single shaft motor 530 and all other applications outside of the electric drive hydraulic fracking system 300.

The quantity of VFD cells 520(a-n) may be any quantity of VFD cells 520(a-n) such that the quantity of windings included in each of the VFD cells 520(a-n) enable the segmented three-phase sinusoidal signal 360(a-c) to be segmented into a sufficient quantity of partitions such that the partitions may be reconnected into a configuration as well as phase-shifted to adequately decrease the quantity of harmonics present in the VFD current waveform of the electric power 550 at the VFD voltage level to sufficiently satisfy IEEE-519 that will be apparent to those skilled in the relevant art(s) without departing from the spirit and scope of the disclosure.

FIG. 6 illustrates a block diagram of an electric driven hydraulic fracking system that provides an electric driven system to execute a fracking operation in that a VFD configuration includes a plurality of VFD cells that are electrically connected to a corresponding VFD contactor from a plurality of VFD contactors in order to bypass a VFD cell that is no longer operating at its full capacity such that the fracking operation continues. An electric driven hydraulic fracking system 600 includes a VFD configuration 610, the power distribution trailer 320, and the single shaft electric motor 530. The VFD configuration 610 includes the plurality of VFD cells 520(a-n), the VFD controller 515, and a plurality of VFD contactors 620(a-n), where n is an integer that is adequate to ensure that each VFD cell 520(a-n) may be bypassed if no longer operating at full capacity. The electric driven hydraulic fracking system 600 shares many similar features with the hydraulic fracking operation 100, the single pump configuration 200, the electric driven fracking system 300, and the electric driven fracking system 500; therefore, only the differences between the electric driven fracking system 600 and the hydraulic fracking operation 100, the single pump configuration 200, the electric driven hydraulic fracking system 300, and the electric driven hydraulic fracking system 500 are to be discussed in further detail.

As noted above, the power distribution trailer 320 may distribute electric power 360 at the power generation voltage level to the VFD transformer 540 and the VFD transformer 540 may then provide the three-phase AC sinusoidal electric power 360(a-c) to each of the VFD cells 520(a-n). Each of the VFD cells 520(a-n) may then collectively generate the electric power 550 at the VFD voltage level to drive the single shaft electric motor 530. The collective generation of the electric power 550 at the VFD voltage level may be the electric power 550 the VFD voltage level that is required to drive the single shaft electric motor 530 at full capacity. In doing so, each of the VFD cells 520(a-n) may be required to collectively generate the electric power 550 at the VFD voltage level to drive the single shaft electric motor 530 at full capacity. Any of the VFD cells 520(a-n) that may not be operating at full capacity may result in the VFD cells 520(a-n) to collectively fail in generating the electric power 550 at the VFD voltage level to drive the single shaft electric motor 530 at full capacity.

For example, the electric power 550 at the VFD voltage level as collectively generated by the VFD cells 520(a-n) may be 4160V in that 4160V is required to drive the single shaft electric motor 530 at full capacity. In doing so, each of the VFD cells 520(a-n) may be required to collectively generate the electric power 550 at the VFD voltage level of 4160V. If the VFD cell 520b fails to no longer operate at full capacity, the electric power 550 at the VFD voltage level may drop by 1100V to 3060V. In doing so, the VFD cells 520(a-n) may no longer be collectively capable to generate the electric power at the VFD voltage level of 4160V to drive the single shaft electric motor 530 at full capacity.

Conventional electric driven fracking systems are not able to continue to execute the fracking operation when at least one of the conventional VFD cells are no longer operating at full capacity. In such conventional systems, the conventional electric driven fracking systems shutdown when at least one of the conventional VFD cells are no longer capable to generate the electric power at the VFD voltage level necessary to drive the single shaft electric motor at full capacity. In doing so, conventional electric driven fracking systems are required to remain shut down until the at least one conventional VFD cell is repaired and/or replaced thereby enabling the repaired and/or replaced conventional VFD cell to operate at full capacity such that the single shaft electric motor may then be driven at full capacity collectively by the conventional VFD cells. In doing so, the entire fracking operation also shuts down and remains dormant until the at least one conventional VFD cell is repaired in which such shut down periods may cost the operating company millions of dollars in lost fracking time.

However, often times the conventional electric driven fracking system may still have the potential to continue the fracking operation at a reduced capacity in that the single shaft electric motor 530 is driven by electric power at a VFD voltage level that is reduced from the VFD voltage level required to drive the single shaft electric motor 530 at full capacity. However, the conventional electric driven fracking systems are not capable of continuing to operate at a reduced capacity if at least one of the conventional VFD cells is no longer operating at full capacity despite having the potential in the remaining conventional VFD cells that are fully operational.

The conventional electric driven fracking systems are required to shut down if at least one of the conventional VFD cells is no longer operating at full capacity due to the conventional fracking systems not having an approach to bypass the at least conventional VFD cell that is no longer operating at full capacity thereby enabling the remaining conventional VFD cells to drive the single shaft electric motor at a reduced capacity. Once the at least one conventional VFD cell fails to operate at full capacity and is required to be deactivated, the conventional electric driven fracking system 600 cannot bypass the deactivated conventional VFDs such that the remaining conventional VFDs may remain operational and drive the single shaft electric motor 530 at a reduced capacity to continue the fracking operation at a reduced capacity. Thus, the conventional electric driving fracking systems lie dormant without executing any type of fracking operation until the at least one VFD cell is replaced and/or repaired and again costing the operating company significant amounts for the time that the conventional electric driving fracking system lies dormant.

Rather than having to lie dormant whenever at least one of the VFD cells 520(a-n) are not operating at full capacity until the at least one VFD cell 520(a-n) is repaired and/or replaced, the electrical driven fracking system 600 may continue to operate at a reduced capacity such that the reduced capacity is still sufficient to generate the electric power 550 at a reduced VFD voltage level that is sufficient to drive the single shaft electric motor 530 at the reduced capacity. In doing so, the electric driven fracking system 600 may continue the operation of the fracking operation despite having at least one VFD cell 520(a-n) not operating at full capacity thereby enabling the operating company to continue to frack the fluid and not incur the financial loss of remaining dormant until the at least one VFD cell 520(a-n) is repaired and/or replaced.

The single VFD 610 includes the plurality of VFD contactors 620(a-n). Each VFD contactor 620(a-n) may be positioned between a combination of VFD cells 520(a-n) such that the corresponding VFD contactor 620(a-n) operates as a bypass for the electric power 550 at the reduced VFD voltage level when a corresponding VFD cell 520(a-n) is no longer operating at full capacity. The VFD controller 515 may continuously monitor parameters associated with each of the VFD cells 520(a-n) via the communication link 365 as the VFD cells 520(a-n) operate to generate the electric power 550 at the VFD voltage level to drive the single shaft electric motor 530 at full capacity. The generation of the electric power 550 at the VFD voltage level to drive the single shaft electric motor 530 at full capacity by the VFD cells 520(a-n) is greater than the electric power 550 at the reduced voltage level generated by the VFD cells 520(a-n) when not driving the single shaft electric motor 530 at full capacity. For example, the VFD cells 520(a-n) may generate the electric power 550 at the VFD voltage level of 4160V when driving the single shaft electric motor 530 at full capacity such that the VFD voltage level of 4160V is greater than the electric power 550 at the reduced VFD voltage level generated by the VFD cells 520(a-n) when not driving the single shaft electric motor 530 at full capacity. In such an example, the VFD cells 520(a-n) may not drive the single shaft electric motor 530 at full capacity when generating the electric power 550 at the reduced voltage level of 3060V.

The VFD controller 515 may continuously monitor parameters associated with each of the VFD cells 520(a-n) via the communication link 365 as the VFD cells 520(a-n) operate to generate the electric power 550 at the VFD voltage level to drive the single shaft electric motor 530 at full capacity. The VFD controller 515 may then determine if any of the parameters associated with each of the VFD cells 520(a-n) deviate to indicate that at least one of the VFD cells 520(a-n) is no longer operating at full capacity and may be a risk to the execution of the fracking operation if the at least one VFD cell 520(a-n) continues to remain operational during the fracking operation. Rather than have to deactivate the electric driven fracking system 600 thereby shutting down the fracking operation until the at least one VFD cell 520(a-n) is repaired and/or replaced, the VFD controller 515 may instruct via the communication link 365 the VFD contactor 620(a-n) associated with the at least one VFD cell 520(a-n) that is no longer operating at full capacity to transition from an open state to a closed state.

In transitioning from the open state to the closed state, the VFD contactor 620(a-n) that is associated with the VFD cell 520(a-n) that is no longer operating at full capacity may operate as a short circuit and divert the electric power 550 at the reduced VFD voltage level from propagating through the VFD cell 520(a-n) that is no longer operating at full capacity. In doing so, the VFD contactor 620(a-n) that is in the closed position and operating as the short circuit may then act as a bypass for the electric power 550 at the reduced VFD voltage level to bypass the VFD cell 520(a-n) that is no longer operating at full capacity and continue to propagate to the remaining VFD cells 520(a-n). In doing so, the remaining VFD cells 520(a-n) that are operating at a full capacity may continue to generate the electric power 550 at the reduced VFD voltage level and continue to drive the single shaft electric motor 530 at a reduced capacity that is sufficient to continue to adequately continue the fracking operation thereby preventing the operating company from having to incur the financial loss of the fracking operation lying dormant.

The VFD controller 515 may continue to maintain the remaining VFD contactors 620(a-n) that are associated with the remaining VFD cells 520(a-n) that are operating at full capacity in the open state. In doing so, the electric power 550 at the reduced VFD voltage level that is generated by the remaining VFD cells 520(a-n) may continue to have such electric power 550 propagate through. In doing so, the remaining VFD cells 520(a-n) may continue to contribute to the generation of the electric power 550 at the reduced VFD voltage level. The reduced VFD voltage level is the electric power 550 with a reduced VFD voltage level that is less than the electric power 550 with the VFD voltage level that is generated when each of the VFD cells 520(a-n) are operating at full capacity.

As each VFD cell 520(a-n) is bypassed, the electric power 550 is reduced to a reduced VFD voltage level that is equivalent to the bypassed VFD cell 520(a-n) no longer contributing to the generation of the electric power 550 at the VFD voltage level when each of the VFD cells 520(a-n) are operating at full capacity. For example, a total of VFD cells 520(a-n) included in the single VFD 610 is three. The electric power 550 at the VFD voltage level generated when each of the three VFD cells 520(a-n) operate at full capacity is 4160V. The electric power 550 at the reduced VFD voltage level generated when one of the three VFD cells 520(a-n) is bypassed by the corresponding VFD contactor 620(a-n) is reduced by 33% of the electric power 550 at the VFD voltage level when all three VFD cells 520(a-n) are operating at full capacity. Thus, the electric power 550 at the reduced VFD voltage level is 33% of 4160V or 3060V in such an example.

The single shaft electric motor 530 may continue to operate at a sufficient level to execute the fracking operation when at least one of the VFD cells 520(a-n) is bypassed by the corresponding VFD contactor 620(a-n). Although the remaining VFDC cells 520(a-n) may provide the electric power 550 at the reduced VFD voltage level, such a reduced VFD voltage level may enable the single shaft electric motor 530 to operate at full torque but with a reduced speed and power level of the electric power 550 at the reduced VFD voltage level. In doing so, the single shaft electric motor 530 may continue to operate at full torque due the current capability of the VFD cells 520(*a-n*) and thereby maintain the fracking operation while operating at a reduced speed and reduced power. Thus, the fracking operation may continue without interruption as the bypassed VFD cell 520(*a-n*) is repaired and/or replaced due to the corresponding VFD contactor 620(*a-n*) bypassing the VFD cell 520(*a-n*) that is not operating at full capacity.

The VFD controller 515 may then continue to monitor the bypassed VFD cell 520(*a-n*) via the communication link 365. Once the operation controller 515 determines that the bypassed VFD cell 520(*a-n*) currently satisfies the appropriate parameters, the VFD controller 515 may instruct the corresponding VFD contactor 620(*a-n*) to transition from the closed state to the open state via the communication link 365. After the corresponding VFD contactor 620(*a-n*) transitions from the closed state to the open state, then the electric power 550 at the VFD voltage level may propagate through the replaced and/or repaired VFD cell 520(*a-n*) due to the corresponding 620(*a-n*) transitioning from the closed state to the open state thereby eliminating the short circuit. Each of the VFD cells 520(*a-n*) may the automatically generate the electric power 550 at the VFD voltage level rather than the reduced VFD voltage level and the single shaft electric motor 530 may automatically transition to operating at full capacity with the electric power 550 at the VFD voltage level. In doing so, the VFD cell 520(*a-n*) that was previously not operating at full capacity may be repaired and/or replaced without disrupting the fracking operation and then transitioned back into operating at full capacity triggering the electric power 550 to automatically increase back up to the VFD voltage level from the reduced VFD voltage level.

As noted above, each of the VFD cells 520(*a-n*) may be isolated from each other. The isolation of each of the VFD cells 520(*a-n*) enables the neutral point of all of the VFD cells 520(*a-n*) when generating the electric power 550 at the VFD voltage level relative to the single shaft electric motor 530 to not be tied to ground of the single VFD 610. The isolation of each of the VFD cells 520(*a-n*) may enable the neutral point of all of the VFD cells 520(*a-n*) to float rather than be tied to ground of the single VFD 610. In doing so, any VFD cell 520(*a-n*) that is then subsequently bypassed by the corresponding VFD contactor 620(*a-n*) may then move the neutral point of the electric power 550 at the reduced VFD voltage level generated by the remaining VFD cells 520(*a-n*) that are operating at full capacity. However the moving of the neutral point is irrelevant to the operation of the single shaft electric motor 530 due to the neutral point not being tied to ground of the single VFD 610. Thus, any of the VFD cells 520(*a-n*) may easily be bypassed and the electric power 550 at the reduced voltage level may automatically be generated by the remaining VFD cells 520(*a-n*) without impacting the operation of the single shaft electric motor 530.

Returning to FIG. 5, the VFD transformer 540 may receive the electric power 355 at the auxiliary voltage level and may pre-charge the capacitors associated with each of the VFD cells 520(*a-n*) before the VFD controller 515 transitions the VFD relay 505 from the open state to the closed state. The VFD cells 520(*a-n*) when collectively activated by the three-phase AC sinusoidal electric power 360(*a-c*) at the power generation voltage level may generate a significant in-rush of current due to the significant amount of current that each of the VFD cells 520(*a-n*) may collectively generate once activated by the three-phase AC sinusoidal electric power 360(*a-c*) at the power generation voltage level. The significant in-rush of current collectively generated by each of the VFD cells 520(*a-n*) once activated by the three-phase AC sinusoidal electric power 360(*a-c*) at the power generation voltage level may then propagate back to the power generation system 310 and have a negative impact on the power generation system 310. The VFD relay 505 may remain in the open state to prevent each of the VFD cells 520(*a-n*) from being exposed to the three-phase AC sinusoidal electric power 360(*a-c*) and in doing so prevent the significant in-rush of current from occurring.

For example, the power generation system 310 is an electric utility power plant that generates the electric power 360 at the power generation voltage level of 12.47 kV and provides such electric power 350 to the power distribution trailer 320 to be distributed to the single VFD 340(*a-n*). The electric utility power plant 310 often times independently generates electric power for an electric utility grid. A significant in-rush of current generated from each single VFD 340(*a-n*) after each single VFD 340(*a-n*) is activated by the electric power 360 at the power generation voltage level of 12.47 kV that is then propagated back to the electric utility power plant 310 may negatively impact the electric utility grid that the electric utility power plant 310 independently generates electric power for. Thus, the operators of the electric utility power plant 310 require that the in-rush of current that is propagated back to the electric utility power plant 310 generated by each single VFD 340(*a-n*) be significantly mitigated. As a result, the VFD relay 505 may remain in the open state to prevent the three-phase AC sinusoidal electric power 360 at the power generation level of 12.47 kV from propagating to the VFD cells 520(*a-n*) thereby preventing the significant in-rush of current from propagating back to the electric utility power plant 310.

In order to significantly mitigate the in-rush of current that is propagated back to the power generation system 310 after the single VFD configuration 510 is activated by the electric power 360 at the power generation voltage level, the VFD transformer 540 may operate to pre-charge the capacitors associated with each of the VFD cells 520(*a-n*) before exposing each of the VFD cells 520(*a-n*) to the three-phase AC sinusoidal electric power 360(*a-c*) at the power generation voltage level. The switchgear transformer 335 may provide the electric power 355 at the auxiliary voltage level to the VFD transformer 540. The VFD transformer 540 may isolate each of the VFD cells 520(*a-n*) from the three-phase AC sinusoidal electric power 360(*a-c*) at the power generation voltage level while the VFD transformer 540 pre-charges the capacitors associated with each of the VFD cells 520(*a-n*) with the electric power 355 at the auxiliary voltage level as provided by the switchgear transformer 335. The VFD transformer 540 may then activate each corresponding VFD cell 520(*a-n*) with the electric power 355 at the auxiliary voltage level by pre-charging the capacitors associated with each VFD cell 520(*a-n*) with the electric power 355 at the auxiliary voltage level. The VFD controller 515 may maintain the VFD relay 505 in the open state to prevent the three-phase AC sinusoidal electric power 360 at the power generation voltage level from propagating to the VFD cells 520(*a-n*) as the capacitors associated with each of the VFD cells 520(*a-n*) pre-charge.

In doing so, each VFD cell 520(*a-n*) may essentially be exposed to the electric power 355 at the auxiliary voltage level and pre-charge to a voltage threshold of the electric power 360 at the power generation voltage level. For example, the each VFD cell 520(*a-n*) may pre-charge with the electric power 355 at the auxiliary voltage level to the voltage threshold of 20% to 25% of the electric power 360 at the power generation voltage level. The voltage threshold may be any percentage of the electric power 360 at the power generation voltage level that each VFD cell 520(*a-n*) is to pre-charge to prevent an in-rush of current that may negatively impact the power generation system 310 that will be apparent to those skilled in the relevant art(s) without departing from the spirit and scope of the disclosure. As each VFD cell 520(*a-n*) pre-charges with the auxiliary voltage level, the VFD controller 515 may monitor the pre-charge of the capacitors associated with each of the VFD cells 520(*a-n*) via the communication link 365. The VFD controller 515 monitor the pre-charge of the capacitors associated with each VFD cell 520(*a-n*) to determine whether the pre-charge has reached the voltage threshold of the electric power 360 at the power generation voltage level. The VFD controller 515 may continue to maintain the VFD relay in the open position preventing the electric power 360 at the power generation voltage level from propagating to the VFD cells 520(*a-n*) when the voltage threshold has not been reached.

After the VFD controller 515 has determined that the capacitors associated with each of the VFD cells 520(*a-n*) have pre-charged to the voltage threshold via the communication link 365 from the electric power 355 at the auxiliary voltage level as provided by the switchgear transformer 335, the VFD controller 515 may then transition the VFD relay 505 from the open position to the closed position via the communication link 365. The transition of the VFD relay 505 from the open position to the closed position may enable the VFD transformer to provide the three-phase AC sinusoidal electric power 360(*a-c*) to each of the VFD cells 520(*a-n*). In doing so, each VFD cell 520(*a-n*) may then be powered by the three-phase AC sinusoidal electric power 360(*a-c*) at the power generation voltage level and thereby generate the electric power 550 at the VFD voltage level to drive the single shaft electric motor 530.

However, the in-rush of current that may propagate back to the power generation system 310 may be significantly reduced due to the pre-charge of the capacitors of each of the VFD cells 520(*a-n*) due to the VFD controller 515 maintaining the VFD relay 505 in the open state. In doing so, the VFD controller 515 limits the VFD cells 520(*a-n*) to being exposed to the electric power 355 at the auxiliary voltage level and prevents the VFD cells 520(*a-n*) from being exposed to the electric power 360 at the power generation voltage level 360 until each of the capacitors associated with the VFD cells 520(*a-n*) has pre-charged to the voltage threshold of the electric power 360 at the power generation voltage level. Thus, any negative impact to the power generation system 310 after each single VFD 340(*a-n*) is exposed to the electric power 360 at the power generation voltage level is significantly decreased.

For example, the power generation system 310 is an electric utility power plant that generates the electric power 360 at the power generation voltage level of 12.47 kV. The VFD controller 515 may maintain the VFD relay 505 in the open state via the communication link 365 as the VFD transformer 540 provides the electric power 355 at the auxiliary voltage level of 480V to the VFD cells 520(*a-n*) as provided by the switchgear transformer 335. The VFD controller 515 may maintain the VFD relay 505 in the open state to prevent the VFD cells 520(*a-n*) from being exposed to the three-phase AC sinusoidal electric power 360 at the power generation level of 12.47 kV to protect the electric utility power plant 310 from experiencing any in-rush current from the VFD cells 520(*a-n*) before the capacitors of the VFD cells 520(*a-n*) have been pre-charged to a voltage threshold of 20% of the electric power 360 at the power generation voltage level of 12.47 kV.

The VFD controller 515 may continue to monitor the VFD cells 520(*a-n*) via the communication link 365 to determine whether the capacitors associated with the VFD cells 520(*a-n*) has reached the voltage threshold of 20% of the electric power 360 at the power generation voltage level of 12.47 kV. The VFD controller 515 may then transition the VFD relay 505 from the open state to the closed state via the communication link 365 when the VFD controller 365 determines that each of the capacitors associated with the VFD cells 520(*a-n*) has pre-charged to the voltage threshold of 20% of the electric power at the power generation voltage level of 12.47 kV. In doing so, the VFD controller 515 may enable the VFD cells 520(*a-n*) to be exposed to the three-phase AC sinusoidal electric power 360(*a-c*) at the power generation voltage level of 12.47 kV. However, any in-rush current that the electric utility power plant may be exposed to may be prevented due to the pre-charge of the capacitors to the voltage threshold of 20% of the electric power 360 at the power generation voltage level of 12.47 kV before being exposed to the electric power 360 at the power generation voltage level of 12.47 kV.

In an embodiment, the VFD transformer 540 may pre-magnetize via the electric power 355 at the auxiliary voltage level as provided by the switchgear transformer 335. In doing so, the VFD controller 515 may monitor the pre-magnetization of the VFD transformer 540 via the communication link 365 to determine whether the pre-magnetization of the VFD transformer has reached a pre-magnetization threshold. The pre-magnetization threshold is the threshold of pre-magnetization of the VFD transformer 540 that when reached and/or exceeded may prevent the VFD cells 520(*a-n*) from generating an in-rush current that may propagate back to the power generation system 310 and cause disruption to the power generation system 310. The VFD controller 515 may continue to maintain the VFD relay 505 in the open state to prevent the electric power 360 at the power generation voltage level from propagating to the VFD cells 520(*a-n*) when the pre-magnetization of the VFD transformer 540 is yet reach the pre-magnetization threshold. The VFD relay 505 may then transition the VFD relay 505 from the open state to the closed state when the VFD controller 515 determines that the pre-magnetization of the VFD transformer 540 has reached the pre-magnetization threshold thereby enabling the three-phase AC sinusoidal electric power 360 at the power generation voltage level to propagate to the VFD cells 520(*a-n*).

The VFD transformer 540 may include a sure power connection in that the VFD transformer 540 may be plugged into a building power connection that provides electric power at a building power voltage that is typical for buildings. The electric power at the building power voltage is significantly lower than the electric power 360 at the power generation voltage level as well as the electric power 355 at the auxiliary voltage level. However, often times, the VFD configuration 510 may lie dormant when not engaged in a fracking operation. When not engaged with a fracking operation, there is no reason to waste electric power by providing the VFD configuration 510 with electric power 360 at the power generation voltage level and/or the electric power 355 at the auxiliary voltage level. Further, the VFD configuration 510 may not be positioned at the fracking site as is the power distribution trailer 320 to even have the opportunity to be powered by the electric power 360 at the power generation level and/or the electric power 355 at the auxiliary voltage level.

However, during the time period 510 that the VFD configuration 510 lies dormant and is not engaged in a fracking operation, maintenance may be performed on the VFD configuration 510. The VFD transformer 540 with the sure power connection enables the VFD configuration 510 to be powered by the electric power at the building power voltage such that the maintenance may be easily performed without wasting any unnecessary electric power provided by the electric power 360 at the power generation voltage level and/or the electric power 355 provided by the auxiliary voltage level. Further, the VFD configuration 510 may be parked outside and exposed to the environmental elements during the time period that the VFD configuration 510 lies dormant. The VFD transformer 540 with the sure power connection enables the VFD configuration 510 to be easily powered by the electric power at the building power voltage such that the heaters, the fans, and all other environmental features included in the VFD configuration 510 may be activated to prevent moisture from accumulating inside the VFD configuration 510 to maintain a quality environment for the VFD configuration 510 as the VFD configuration 510 lies dormant.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. An electric driven hydraulic fracking system that pumps a fracking media into a fracking well to execute a fracking operation to extract a fluid from the fracking well, comprising:
   a VFD configuration that is configured to:
      reduce a level of harmonics in a VFD current waveform included in a VFD voltage signal at a VFD voltage level that propagate back to a power generation system to below a level of total harmonic distortion that satisfies IEEE-519, and
      drive an electric motor to control an operation of the electric motor and a hydraulic pump with the level of total harmonic distortion that satisfies IEEE-519 in the VFD current waveform of the electric power at the VFD voltage level.

2. The electric driven hydraulic fracking system of claim 1, wherein the VFD configuration is further configured to:
   mitigate the level of harmonics in the VFD current waveform included in the VFD voltage signal at the VFD voltage level, wherein the VFD voltage signal is converted from an AC voltage signal generated by a power generation system, and
   drive the electric motor to control the operation of the electric motor and the hydraulic pump with the mitigated level of harmonics included in the VFD current waveform of the electric power at the VFD voltage level.

3. The electric driven hydraulic fracking system of claim 2, wherein the VFD configuration is further configured to:
   receive electric power generated by the power generation system at a power generation voltage level, wherein an AC voltage signal is associated with the electric power at the power generation voltage level; and
   convert the AC voltage signal associated with the electric power at the power generation voltage level to the VFD voltage signal at the VFD voltage level.

4. The electric driven hydraulic fracking system of claim 2, wherein the VFD configuration is further configured to:
   apply a plurality of phase changing sinusoidal signals to the AC voltage signal associated with the electric power at the power generation voltage level; and
   mitigate the level of harmonics in the VFD current waveform included in the VFD voltage signal at the VFD voltage level based on the plurality of phase changing sinusoidal signals applied to the AC voltage signal to convert the AC voltage signal to the VFD voltage signal.

5. The electric driven hydraulic fracking system of claim 4, wherein the VFD configuration is further configured to apply each phase changing sinusoidal signal at a phase shift relative to each other phase changing sinusoidal signal in transitioning the AC voltage signal to the VFD voltage signal to reduce the level of harmonics in the VFD current waveform included in the VFD voltage signal that propagate back to the power generation system to below the level of total harmonic distortion that satisfies IEEE-519.

6. The electric driven hydraulic fracking system of claim 5, wherein the VFD configuration is further configured to reduce the level of harmonics introduced at a common point of coupling between the VFD configuration and the power generation system to enable the power generation system to provide the electric power at the power generation level and to prevent a disruption to the power generation system.

7. The electric driven hydraulic fracking system of claim 2, wherein the VFD configuration comprises:
   a VFD transformer that is configured to:
      apply a phase shift to the plurality of phase changing sinusoidal signals included in the AC sinusoidal signal of the electric power at the power generation voltage level that is generated by the power generation system and received by the VFD configuration, and
      convert the electric power at the power generation voltage level to the electric power at the VFD voltage level based on the phase shift of each of the sinusoidal signals included in the AC voltage signal of the electric power at the power generation voltage level to mitigate the level of harmonics in the VFD current waveform included in the VFD voltage signal at the VFD voltage level.

8. A method for an electric driven hydraulic fracking system that pumps a fracking media into a fracking well to execute a fracking operation to extract a fluid from the fracking well, comprising:
   reducing a level of harmonics in a VFD current waveform included in a VFD voltage signal at a VFD voltage level that propagate back to a power generation system to below a level of total harmonic distortion that satisfies IEEE-519; and driving an electric motor to control an operation of the electric motor and a hydraulic pump with the level of total harmonic distortion that satisfies IEEE-519 in the VFD current waveform of the electric power at the VFD voltage level.

9. The method of claim 8, further comprising:

mitigating the level of harmonics in the VFD current waveform included in a VFD voltage signal at a VFD voltage level, wherein the VFD voltage signal is converted from an AC voltage signal generated by the power generation system; and driving the electric motor to control the operation of the electric motor and the hydraulic pump with the mitigated level of harmonics included in the VFD current waveform of the electric power at the VFD voltage level.

10. The method of claim 9, further comprising:

receiving electric power generated by the power generation system at a power generation voltage level, wherein an AC voltage signal is associated with the electric power at the power generation voltage level; and converting the AC signal associated with the electric power at the power generation voltage level to the VFD voltage signal at the VFD voltage level.

11. The method of claim 9, wherein the mitigating comprises:

applying a plurality of phase changing sinusoidal signals to the AC voltage signal associated with the electric power at the power generation voltage level; and mitigating the level of harmonics in the VFD current waveform included in the VFD voltage signal at the VFD voltage level based on the plurality of phase changing sinusoidal signals applied to the AC voltage signal to convert the AC voltage signal to the VFD voltage signal.

12. The method of claim 11, wherein the converting further comprises:

applying each phase changing sinusoidal signal at a phase shift relative to each other phase changing sinusoidal signal in transitioning the AC voltage signal to the VFD voltage signal to reduce the level of harmonics in the VFD current waveform included in the VFD voltage signal that propagates back to the power generation system to below the level of total harmonic distortion that satisfies IEEE-519.

13. The method of 12, wherein the converting further comprises:

reducing the level of harmonics introduced at a common point of coupling between the VFD and the power generation system to enable the power generation system to provide the electric power at the power generation voltage level to prevent a disruption to the power generation system.

14. The method of claim 9, wherein the converting further comprises:

applying by a VFD transformer a phase shift to the plurality of phase changing sinusoidal signals included in the AC sinusoidal signal of the electric power at the power generation voltage level that is provided by the power distribution trailer to the VFD configuration; and converting the electric power at the power generation voltage level to the electric power at the VFD voltage level based on the phase shift of each of the sinusoidal signals included in the AC voltage signal of the electric power at the power generation voltage level to mitigate the level of harmonics in the VFD current waveform included in the VFD voltage signal at the VFD voltage level.

15. The method of claim 14, further comprising:

receiving the electric power by the VFD transformer at the power generation voltage level and the electric power at the auxiliary voltage level as distributed by a power distribution trailer; and pre-charging a plurality of capacitors associated with the VFD configuration to a voltage threshold with the electric power at the auxiliary voltage level to prevent an in-rush current that propagates to the power generation system after the VFD transformer provides the electric power at the power generation voltage level to the VFD configuration before the capacitors are pre-charged to a voltage threshold, wherein the voltage threshold is a percentage of the power generation voltage level that the capacitors are to be pre-charged to prevent the in-rush current after the VFD transformer provides the electric power at the power generation voltage level.

16. An electric driven hydraulic fracking system that pumps a fracking media into a fracking well to execute a fracking operation to extract a fluid from the fracking well, comprises:

a plurality of VFD configurations with each VFD configuration configured to:

reduce a level of harmonics in a VFD current waveform included in a VFD voltage signal at a VFD voltage level that propagate back to a power generation system to below a level of total harmonic distortion that satisfies IEEE-519, and drive a corresponding electric motor from a plurality of electric motors to control an operation of each corresponding electric motor and a corresponding hydraulic pump from a plurality of hydraulic pumps with level of total harmonic distortion that satisfies IEEE-519 in the VFD current waveform of the electric power at the VFD voltage level.

17. The electric driven hydraulic fracking system of claim 16, wherein each VFD configuration is further configured to:

mitigate the level of harmonics in the VFD current waveform included in a VFD voltage signal at the VFD voltage level, wherein the VFD voltage signal is converted from an AC voltage signal generated by the power generation system, and drive the corresponding electric motor from the plurality of electric motors to control the operation of each corresponding electric motor and the corresponding hydraulic pump from the plurality of hydraulic pumps with the mitigated level of harmonics included in the VFD current waveform of the electric power at the VFD voltage level.

18. The electric driven hydraulic fracking system of claim 17, wherein each VFD configuration is further configured to:

receive electric power generated by the power generation system at the power generation voltage level, wherein an AC voltage signal is associated with the electric power at the power generation voltage level; and convert the AC voltage signal associated with the electric power at the power generation voltage level to the VFD voltage signal at the VFD voltage level.

19. The electric driven hydraulic fracking system of claim 18, wherein each VFD configuration is further configured to:

apply a plurality of phase changing sinusoidal signal to the AC voltage signal associated with the electric power at the power generation voltage level; and mitigate the level of harmonics in the VFD current waveform included in the VFD voltage signal at the VFD voltage level based on the plurality of phase changing sinusoidal signals applied to the AC voltage signal to convert the AC voltage signal to the VFD voltage signal.

20. The electric driven hydraulic fracking system of claim 18, wherein each VFD configuration is further configured to apply each phase changing sinusoidal signal at a phase shift relative to each other phase changing sinusoidal signal in transitioning each corresponding AC voltage signal to each corresponding VFD voltage signal to reduce the level of harmonics in the VFD current waveform included in each corresponding VFD voltage signal that propagates back to the power generation system to below the level of total harmonic distortion that satisfies IEEE-519.

* * * * *